United States Patent
Paithane et al.

(10) Patent No.: US 10,135,846 B2
(45) Date of Patent: Nov. 20, 2018

(54) LAUNCHER FOR SETTING ANALYSIS ENVIRONMENT VARIATIONS FOR MALWARE DETECTION

(71) Applicant: FireEye, Inc., Milpitas, CA (US)

(72) Inventors: Sushant Paithane, Sunnyvale, CA (US); Sai Omkar Vashisht, Morgan Hill, CA (US); Yasir Khalid, Fremont, CA (US); Alexandre Pilipenko, Belmont, CA (US)

(73) Assignee: FireEye, Inc., Milpitas, CA (US)

( * ) Notice: Subject to any disclaimer, the term of this patent is extended or adjusted under 35 U.S.C. 154(b) by 41 days.

(21) Appl. No.: 14/937,802

(22) Filed: Nov. 10, 2015

(65) Prior Publication Data

US 2018/0048660 A1     Feb. 15, 2018

(51) Int. Cl.
G06F 11/00  (2006.01)
H04L 29/06  (2006.01)
G06F 21/62  (2013.01)
G06F 12/14  (2006.01)

(52) U.S. Cl.
CPC ...... *H04L 63/1416* (2013.01); *G06F 21/6218* (2013.01)

(58) Field of Classification Search
CPC .......... G06F 21/562; G06F 21/566; H04L 2463/144; H04L 63/1408; H04L 63/1416; H04L 63/145; H04L 63/1491
USPC .......... 726/23, 24, 25, 22; 182/187, 188
See application file for complete search history.

(56) References Cited

U.S. PATENT DOCUMENTS

| | | |
|---|---|---|
| 4,292,580 A | 9/1981 | Ott et al. |
| 5,175,732 A | 12/1992 | Hendel et al. |
| 5,440,723 A | 8/1995 | Arnold et al. |
| 5,490,249 A | 2/1996 | Miller |
| 5,603,027 A | 2/1997 | Ohkami |
| 5,657,473 A | 8/1997 | Killean et al. |
| 5,842,002 A | 11/1998 | Schnurer et al. |

(Continued)

FOREIGN PATENT DOCUMENTS

| | | |
|---|---|---|
| GB | 2439806 A | 1/2008 |
| GB | 2490431 A | 10/2012 |

(Continued)

OTHER PUBLICATIONS

"Mining Specification of Malicious Behavior"—Jha et al, UCSB, Sep. 2007 https://www.cs.ucsb.edu/about.chris/research/doc/esec07.sub.--mining.pdf- .

(Continued)

*Primary Examiner* — Gary S Garcia
(74) *Attorney, Agent, or Firm* — Rutan & Tucker, LLP

(57) ABSTRACT

A system and method for automatically analyzing an object for malware is described. Operating one or more virtual machines, the system and method provide an analysis environment variation framework to provide a more robust analysis of an object for malware. The multi-application, multi-plugin processing framework is configured within a virtual machine, where the framework generates a plurality of processes for analyzing the object for malware and each of plurality of processes is configured with a different application and plug-in combination selected based in part on a type of object being analyzed.

45 Claims, 9 Drawing Sheets

(56) References Cited

U.S. PATENT DOCUMENTS

| | | |
|---|---|---|
| 5,978,917 A | 11/1999 | Chi |
| 5,983,348 A | 11/1999 | Ji |
| 6,088,803 A | 7/2000 | Tso et al. |
| 6,092,194 A | 7/2000 | Touboul |
| 6,094,677 A | 7/2000 | Capek et al. |
| 6,108,799 A | 8/2000 | Boulay et al. |
| 6,154,844 A | 11/2000 | Touboul et al. |
| 6,269,330 B1 | 7/2001 | Cidon et al. |
| 6,272,641 B1 | 8/2001 | Ji |
| 6,279,113 B1 | 8/2001 | Vaidya |
| 6,298,445 B1 | 10/2001 | Shostack et al. |
| 6,357,008 B1 | 3/2002 | Nachenberg |
| 6,424,627 B1 | 7/2002 | Sørhaug et al. |
| 6,442,696 B1 | 8/2002 | Wray et al. |
| 6,484,315 B1 | 11/2002 | Ziese |
| 6,487,666 B1 | 11/2002 | Shanklin et al. |
| 6,493,756 B1 | 12/2002 | O'Brien et al. |
| 6,550,012 B1 | 4/2003 | Villa et al. |
| 6,700,497 B2 | 3/2004 | Hibbs et al. |
| 6,775,657 B1 | 8/2004 | Baker |
| 6,831,893 B1 | 12/2004 | Ben Nun et al. |
| 6,832,367 B1 | 12/2004 | Choi et al. |
| 6,895,550 B2 | 5/2005 | Kanchirayappa et al. |
| 6,898,632 B2 | 5/2005 | Gordy et al. |
| 6,907,396 B1 | 6/2005 | Muttik et al. |
| 6,941,348 B2 | 9/2005 | Petry et al. |
| 6,971,097 B1 | 11/2005 | Wallman |
| 6,981,279 B1 | 12/2005 | Arnold et al. |
| 7,007,107 B1 | 2/2006 | Ivchenko et al. |
| 7,028,179 B2 | 4/2006 | Anderson et al. |
| 7,043,757 B2 | 5/2006 | Hoefelmeyer et al. |
| 7,069,316 B1 | 6/2006 | Gryaznov |
| 7,080,407 B1 | 7/2006 | Zhao et al. |
| 7,080,408 B1 | 7/2006 | Pak et al. |
| 7,093,002 B2 | 8/2006 | Wolff et al. |
| 7,093,239 B1 | 8/2006 | van der Made |
| 7,096,498 B2 | 8/2006 | Judge |
| 7,100,201 B2 | 8/2006 | Izatt |
| 7,107,617 B2 | 9/2006 | Hursey et al. |
| 7,159,149 B2 | 1/2007 | Spiegel et al. |
| 7,213,260 B2 | 5/2007 | Judge |
| 7,231,667 B2 | 6/2007 | Jordan |
| 7,240,364 B1 | 7/2007 | Branscomb et al. |
| 7,240,368 B1 | 7/2007 | Roesch et al. |
| 7,243,371 B1 | 7/2007 | Kasper et al. |
| 7,249,175 B1 | 7/2007 | Donaldson |
| 7,287,278 B2 | 10/2007 | Liang |
| 7,308,716 B2 | 12/2007 | Danford et al. |
| 7,328,453 B2 | 2/2008 | Merkle, Jr. et al. |
| 7,346,486 B2 | 3/2008 | Ivancic et al. |
| 7,356,736 B2 | 4/2008 | Natvig |
| 7,386,888 B2 | 6/2008 | Liang et al. |
| 7,392,542 B2 | 6/2008 | Bucher |
| 7,418,729 B2 | 8/2008 | Szor |
| 7,428,300 B1 | 9/2008 | Drew et al. |
| 7,441,272 B2 | 10/2008 | Durham et al. |
| 7,448,084 B1 | 11/2008 | Apap et al. |
| 7,458,098 B2 | 11/2008 | Judge et al. |
| 7,464,404 B2 | 12/2008 | Carpenter et al. |
| 7,464,407 B2 | 12/2008 | Nakae et al. |
| 7,467,408 B1 | 12/2008 | O'Toole, Jr. |
| 7,478,428 B1 | 1/2009 | Thomlinson |
| 7,480,773 B1 | 1/2009 | Reed |
| 7,487,543 B2 | 2/2009 | Arnold et al. |
| 7,496,960 B1 | 2/2009 | Chen et al. |
| 7,496,961 B2 | 2/2009 | Zimmer et al. |
| 7,519,990 B1 | 4/2009 | Xie |
| 7,523,493 B2 | 4/2009 | Liang et al. |
| 7,530,104 B1 | 5/2009 | Thrower et al. |
| 7,540,025 B2 | 5/2009 | Tzadikario |
| 7,546,638 B2 | 6/2009 | Anderson et al. |
| 7,565,550 B2 | 7/2009 | Liang et al. |
| 7,568,233 B1 | 7/2009 | Szor et al. |
| 7,584,455 B2 | 9/2009 | Ball |
| 7,603,715 B2 | 10/2009 | Costa et al. |
| 7,607,171 B1 | 10/2009 | Marsden et al. |
| 7,639,714 B2 | 12/2009 | Stolfo et al. |
| 7,644,441 B2 | 1/2010 | Schmid et al. |
| 7,657,419 B2 | 2/2010 | van der Made |
| 7,676,841 B2 | 3/2010 | Sobchuk et al. |
| 7,698,548 B2 | 4/2010 | Shelest et al. |
| 7,707,633 B2 | 4/2010 | Danford et al. |
| 7,712,136 B2 | 5/2010 | Sprosts et al. |
| 7,730,011 B1 | 6/2010 | Deninger et al. |
| 7,739,740 B1 | 6/2010 | Nachenberg et al. |
| 7,779,463 B2 | 8/2010 | Stolfo et al. |
| 7,784,097 B1 | 8/2010 | Stolfo et al. |
| 7,832,008 B1 | 11/2010 | Kraemer |
| 7,836,502 B1 | 11/2010 | Zhao et al. |
| 7,849,506 B1 | 12/2010 | Dansey et al. |
| 7,854,007 B2 | 12/2010 | Sprosts et al. |
| 7,869,073 B2 | 1/2011 | Oshima |
| 7,877,803 B2 | 1/2011 | Enstone et al. |
| 7,904,959 B2 | 3/2011 | Sidiroglou et al. |
| 7,908,660 B2 | 3/2011 | Bahl |
| 7,930,738 B1 | 4/2011 | Petersen |
| 7,937,387 B2 | 5/2011 | Frazier et al. |
| 7,937,761 B1 | 5/2011 | Bennett |
| 7,949,849 B2 | 5/2011 | Lowe et al. |
| 7,996,556 B2 | 8/2011 | Raghavan et al. |
| 7,996,836 B1 | 8/2011 | McCorkendale et al. |
| 7,996,904 B1 | 8/2011 | Chiueh et al. |
| 7,996,905 B2 | 8/2011 | Arnold et al. |
| 8,006,305 B2 | 8/2011 | Aziz |
| 8,010,667 B2 | 8/2011 | Zhang et al. |
| 8,020,206 B2 | 9/2011 | Hubbard et al. |
| 8,028,338 B1 | 9/2011 | Schneider et al. |
| 8,042,184 B1 | 10/2011 | Batenin |
| 8,045,094 B2 | 10/2011 | Teragawa |
| 8,045,458 B2 | 10/2011 | Alperovitch et al. |
| 8,069,484 B2 | 11/2011 | McMillan et al. |
| 8,087,086 B1 | 12/2011 | Lai et al. |
| 8,171,553 B2 | 5/2012 | Aziz et al. |
| 8,176,049 B2 | 5/2012 | Deninger et al. |
| 8,176,480 B1 | 5/2012 | Spertus |
| 8,201,246 B1 | 6/2012 | Wu et al. |
| 8,204,984 B1 | 6/2012 | Aziz et al. |
| 8,214,905 B1 | 7/2012 | Doukhvalov et al. |
| 8,220,055 B1 | 7/2012 | Kennedy |
| 8,225,288 B2 | 7/2012 | Miller et al. |
| 8,225,373 B2 | 7/2012 | Kraemer |
| 8,233,882 B2 | 7/2012 | Rogel |
| 8,234,640 B1 | 7/2012 | Fitzgerald et al. |
| 8,234,709 B2 | 7/2012 | Viljoen et al. |
| 8,239,944 B1 | 8/2012 | Nachenberg et al. |
| 8,260,914 B1 | 9/2012 | Ranjan |
| 8,266,091 B1 | 9/2012 | Gubin et al. |
| 8,286,251 B2 | 10/2012 | Eker et al. |
| 8,291,499 B2 | 10/2012 | Aziz et al. |
| 8,307,435 B1 | 11/2012 | Mann et al. |
| 8,307,443 B2 | 11/2012 | Wang et al. |
| 8,312,545 B2 | 11/2012 | Tuvell et al. |
| 8,321,936 B1 | 11/2012 | Green et al. |
| 8,321,941 B2 | 11/2012 | Tuvell et al. |
| 8,332,571 B1 | 12/2012 | Edwards, Sr. |
| 8,365,286 B2 | 1/2013 | Poston |
| 8,365,297 B1 | 1/2013 | Parshin et al. |
| 8,370,938 B1 | 2/2013 | Daswani et al. |
| 8,370,939 B2 | 2/2013 | Zaitsev et al. |
| 8,375,444 B2 | 2/2013 | Aziz et al. |
| 8,381,299 B2 | 2/2013 | Stolfo et al. |
| 8,402,529 B1 | 3/2013 | Green et al. |
| 8,464,340 B2 | 6/2013 | Ahn et al. |
| 8,479,174 B2 | 7/2013 | Chiriac |
| 8,479,276 B1 | 7/2013 | Vaystikh et al. |
| 8,479,291 B1 | 7/2013 | Bodke |
| 8,510,827 B1 | 8/2013 | Leake et al. |
| 8,510,828 B1 | 8/2013 | Guo et al. |
| 8,510,842 B2 | 8/2013 | Amit et al. |
| 8,516,478 B1 | 8/2013 | Edwards et al. |
| 8,516,590 B1 | 8/2013 | Ranadive et al. |
| 8,516,593 B2 | 8/2013 | Aziz |
| 8,522,348 B2 | 8/2013 | Chen et al. |
| 8,528,086 B1 | 9/2013 | Aziz |

(56) References Cited

U.S. PATENT DOCUMENTS

| | | |
|---|---|---|
| 8,533,824 B2 | 9/2013 | Hutton et al. |
| 8,539,582 B1 | 9/2013 | Aziz et al. |
| 8,549,638 B2 | 10/2013 | Aziz |
| 8,555,391 B1 | 10/2013 | Demir et al. |
| 8,561,177 B1 | 10/2013 | Aziz et al. |
| 8,566,476 B2 | 10/2013 | Shiffer et al. |
| 8,566,946 B1 | 10/2013 | Aziz et al. |
| 8,584,094 B2 | 11/2013 | Dadhia et al. |
| 8,584,234 B1 | 11/2013 | Sobel et al. |
| 8,584,239 B2 | 11/2013 | Aziz et al. |
| 8,595,834 B2 | 11/2013 | Xie et al. |
| 8,627,476 B1 | 1/2014 | Satish et al. |
| 8,635,696 B1 | 1/2014 | Aziz |
| 8,682,054 B2 | 3/2014 | Xue et al. |
| 8,682,812 B1 | 3/2014 | Ranjan |
| 8,689,333 B2 | 4/2014 | Aziz |
| 8,695,096 B1 | 4/2014 | Zhang |
| 8,713,631 B1 | 4/2014 | Pavlyushchik |
| 8,713,681 B2 | 4/2014 | Silberman et al. |
| 8,726,392 B1 | 5/2014 | McCorkendale et al. |
| 8,739,280 B2 | 5/2014 | Chess et al. |
| 8,776,229 B1 | 7/2014 | Aziz |
| 8,782,792 B1 | 7/2014 | Bodke |
| 8,789,172 B2 | 7/2014 | Stolfo et al. |
| 8,789,178 B2 | 7/2014 | Kejriwal et al. |
| 8,793,278 B2 | 7/2014 | Frazier et al. |
| 8,793,787 B2 | 7/2014 | Ismael et al. |
| 8,805,947 B1 | 8/2014 | Kuzkin et al. |
| 8,806,647 B1 | 8/2014 | Daswani et al. |
| 8,832,829 B2 | 9/2014 | Manni et al. |
| 8,850,570 B1 | 9/2014 | Ramzan |
| 8,850,571 B2 | 9/2014 | Staniford et al. |
| 8,881,234 B2 | 11/2014 | Narasimhan et al. |
| 8,881,271 B2 | 11/2014 | Butler, II |
| 8,881,282 B1 | 11/2014 | Aziz et al. |
| 8,898,788 B1 | 11/2014 | Aziz et al. |
| 8,935,779 B2 | 1/2015 | Manni et al. |
| 8,949,257 B2 | 2/2015 | Shiffer et al. |
| 8,984,638 B1 | 3/2015 | Aziz et al. |
| 8,990,939 B2 | 3/2015 | Staniford et al. |
| 8,990,944 B1 | 3/2015 | Singh et al. |
| 8,997,219 B2 | 3/2015 | Staniford et al. |
| 9,009,822 B1 | 4/2015 | Ismael et al. |
| 9,009,823 B1 | 4/2015 | Ismael et al. |
| 9,027,135 B1 | 5/2015 | Aziz |
| 9,071,638 B1 | 6/2015 | Aziz et al. |
| 9,092,625 B1* | 7/2015 | Kashyap ............ G06F 21/566 |
| 9,104,867 B1 | 8/2015 | Thioux et al. |
| 9,106,630 B2 | 8/2015 | Frazier et al. |
| 9,106,694 B2 | 8/2015 | Aziz et al. |
| 9,117,079 B1* | 8/2015 | Huang ................ G06F 21/566 |
| 9,118,715 B2 | 8/2015 | Staniford et al. |
| 9,159,035 B1 | 10/2015 | Ismael et al. |
| 9,171,160 B2 | 10/2015 | Vincent et al. |
| 9,176,843 B1 | 11/2015 | Ismael et al. |
| 9,189,627 B1 | 11/2015 | Islam |
| 9,195,829 B1 | 11/2015 | Goradia et al. |
| 9,197,664 B1 | 11/2015 | Aziz et al. |
| 9,223,972 B1 | 12/2015 | Vincent et al. |
| 9,225,740 B1 | 12/2015 | Ismael et al. |
| 9,241,010 B1 | 1/2016 | Bennett et al. |
| 9,251,343 B1 | 2/2016 | Vincent et al. |
| 9,262,635 B2 | 2/2016 | Paithane et al. |
| 9,268,936 B2 | 2/2016 | Butler |
| 9,275,229 B2 | 3/2016 | LeMasters |
| 9,282,109 B1 | 3/2016 | Aziz et al. |
| 9,294,501 B2 | 3/2016 | Mesdaq et al. |
| 9,300,686 B2 | 3/2016 | Pidathala et al. |
| 9,306,960 B1 | 4/2016 | Aziz |
| 9,306,974 B1 | 4/2016 | Aziz et al. |
| 9,311,479 B1 | 4/2016 | Manni et al. |
| 9,355,247 B1 | 5/2016 | Thioux et al. |
| 9,356,944 B1 | 5/2016 | Aziz |
| 9,363,280 B1 | 6/2016 | Rivlin et al. |
| 9,367,681 B1 | 6/2016 | Ismael et al. |
| 9,398,028 B1 | 7/2016 | Karandikar et al. |
| 9,413,781 B2 | 8/2016 | Cunningham et al. |
| 9,430,646 B1 | 8/2016 | Mushtaq et al. |
| 9,432,389 B1 | 8/2016 | Khalid et al. |
| 9,438,613 B1 | 9/2016 | Paithane et al. |
| 9,438,622 B1 | 9/2016 | Staniford et al. |
| 9,438,623 B1 | 9/2016 | Thioux et al. |
| 9,459,901 B2 | 10/2016 | Jung et al. |
| 9,483,644 B1 | 11/2016 | Paithane et al. |
| 9,495,180 B2 | 11/2016 | Ismael |
| 9,516,057 B2 | 12/2016 | Aziz |
| 9,519,782 B2 | 12/2016 | Aziz et al. |
| 9,536,091 B2 | 1/2017 | Paithane et al. |
| 9,560,059 B1 | 1/2017 | Islam |
| 9,565,202 B1 | 2/2017 | Kindlund et al. |
| 9,591,015 B1 | 3/2017 | Amin et al. |
| 9,591,020 B1 | 3/2017 | Aziz |
| 9,594,904 B1 | 3/2017 | Jain et al. |
| 9,594,905 B1 | 3/2017 | Ismael et al. |
| 9,594,912 B1 | 3/2017 | Thioux et al. |
| 9,609,007 B1 | 3/2017 | Rivlin et al. |
| 9,626,509 B1 | 4/2017 | Khalid et al. |
| 9,628,498 B1 | 4/2017 | Aziz et al. |
| 9,628,507 B2 | 4/2017 | Haq et al. |
| 9,635,039 B1 | 4/2017 | Islam et al. |
| 9,641,546 B1 | 5/2017 | Manni et al. |
| 9,661,009 B1 | 5/2017 | Karandikar et al. |
| 9,661,018 B1 | 5/2017 | Aziz |
| 2001/0005889 A1 | 6/2001 | Albrecht |
| 2001/0047326 A1 | 11/2001 | Broadbent et al. |
| 2002/0018903 A1 | 2/2002 | Kokubo et al. |
| 2002/0038430 A1 | 3/2002 | Edwards et al. |
| 2002/0091819 A1 | 7/2002 | Melchione et al. |
| 2002/0095607 A1 | 7/2002 | Lin-Hendel |
| 2002/0116627 A1 | 8/2002 | Tarbotton et al. |
| 2002/0144156 A1 | 10/2002 | Copeland |
| 2002/0162015 A1 | 10/2002 | Tang |
| 2002/0166063 A1 | 11/2002 | Lachman et al. |
| 2002/0169952 A1 | 11/2002 | DiSanto et al. |
| 2002/0184528 A1 | 12/2002 | Shevenell et al. |
| 2002/0188887 A1 | 12/2002 | Largman et al. |
| 2002/0194490 A1 | 12/2002 | Halperin et al. |
| 2003/0021728 A1 | 1/2003 | Sharpe et al. |
| 2003/0074578 A1 | 4/2003 | Ford et al. |
| 2003/0084318 A1 | 5/2003 | Schertz |
| 2003/0101381 A1 | 5/2003 | Mateev et al. |
| 2003/0115483 A1 | 6/2003 | Liang |
| 2003/0188190 A1 | 10/2003 | Aaron et al. |
| 2003/0191957 A1 | 10/2003 | Hypponen et al. |
| 2003/0200460 A1 | 10/2003 | Morota et al. |
| 2003/0212902 A1 | 11/2003 | van der Made |
| 2003/0229801 A1 | 12/2003 | Kouznetsov et al. |
| 2003/0237000 A1 | 12/2003 | Denton et al. |
| 2004/0003323 A1 | 1/2004 | Bennett et al. |
| 2004/0006473 A1 | 1/2004 | Mills et al. |
| 2004/0015712 A1 | 1/2004 | Szor |
| 2004/0019832 A1 | 1/2004 | Arnold et al. |
| 2004/0047356 A1 | 3/2004 | Bauer |
| 2004/0083408 A1 | 4/2004 | Spiegel et al. |
| 2004/0088581 A1 | 5/2004 | Brawn et al. |
| 2004/0093513 A1 | 5/2004 | Cantrell et al. |
| 2004/0111531 A1 | 6/2004 | Staniford et al. |
| 2004/0117478 A1 | 6/2004 | Triulzi et al. |
| 2004/0117624 A1 | 6/2004 | Brandt et al. |
| 2004/0128355 A1 | 7/2004 | Chao et al. |
| 2004/0165588 A1 | 8/2004 | Pandya |
| 2004/0236963 A1 | 11/2004 | Danford et al. |
| 2004/0243349 A1 | 12/2004 | Greifeneder et al. |
| 2004/0249911 A1 | 12/2004 | Alkhatib et al. |
| 2004/0255161 A1 | 12/2004 | Cavanaugh |
| 2004/0268147 A1 | 12/2004 | Wiederin et al. |
| 2005/0005159 A1 | 1/2005 | Oliphant |
| 2005/0021740 A1 | 1/2005 | Bar et al. |
| 2005/0033960 A1 | 2/2005 | Vialen et al. |
| 2005/0033989 A1 | 2/2005 | Poletto et al. |
| 2005/0050148 A1 | 3/2005 | Mohammadioun et al. |
| 2005/0086523 A1 | 4/2005 | Zimmer et al. |
| 2005/0091513 A1 | 4/2005 | Mitomo et al. |
| 2005/0091533 A1 | 4/2005 | Omote et al. |

(56) References Cited

U.S. PATENT DOCUMENTS

| | | |
|---|---|---|
| 2005/0091652 A1 | 4/2005 | Ross et al. |
| 2005/0108562 A1 | 5/2005 | Khazan et al. |
| 2005/0114663 A1 | 5/2005 | Cornell et al. |
| 2005/0125195 A1 | 6/2005 | Brendel |
| 2005/0149726 A1 | 7/2005 | Joshi et al. |
| 2005/0157662 A1 | 7/2005 | Bingham et al. |
| 2005/0183143 A1 | 8/2005 | Anderholm et al. |
| 2005/0201297 A1 | 9/2005 | Peikari |
| 2005/0210533 A1 | 9/2005 | Copeland et al. |
| 2005/0238005 A1 | 10/2005 | Chen et al. |
| 2005/0240781 A1 | 10/2005 | Gassoway |
| 2005/0262562 A1 | 11/2005 | Gassoway |
| 2005/0265331 A1 | 12/2005 | Stolfo |
| 2005/0283839 A1 | 12/2005 | Cowburn |
| 2006/0010495 A1 | 1/2006 | Cohen et al. |
| 2006/0015416 A1 | 1/2006 | Hoffman et al. |
| 2006/0015715 A1 | 1/2006 | Anderson |
| 2006/0015747 A1 | 1/2006 | Van de Ven |
| 2006/0021029 A1 | 1/2006 | Brickell et al. |
| 2006/0021054 A1 | 1/2006 | Costa et al. |
| 2006/0031476 A1 | 2/2006 | Mathes et al. |
| 2006/0047665 A1 | 3/2006 | Neil |
| 2006/0070130 A1 | 3/2006 | Costea et al. |
| 2006/0075496 A1 | 4/2006 | Carpenter et al. |
| 2006/0095968 A1 | 5/2006 | Portolani et al. |
| 2006/0101516 A1 | 5/2006 | Sudaharan et al. |
| 2006/0101517 A1 | 5/2006 | Banzhof et al. |
| 2006/0117385 A1 | 6/2006 | Mester et al. |
| 2006/0123477 A1 | 6/2006 | Raghavan et al. |
| 2006/0143709 A1 | 6/2006 | Brooks et al. |
| 2006/0150249 A1 | 7/2006 | Gassen et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Gilde et al. |
| 2006/0173992 A1 | 8/2006 | Weber et al. |
| 2006/0179147 A1 | 8/2006 | Tran et al. |
| 2006/0184632 A1 | 8/2006 | Marino et al. |
| 2006/0191010 A1 | 8/2006 | Benjamin |
| 2006/0221956 A1 | 10/2006 | Narayan et al. |
| 2006/0236393 A1 | 10/2006 | Kramer et al. |
| 2006/0242709 A1 | 10/2006 | Seinfeld et al. |
| 2006/0248519 A1 | 11/2006 | Jaeger et al. |
| 2006/0248582 A1 | 11/2006 | Panjwani et al. |
| 2006/0251104 A1 | 11/2006 | Koga |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0019286 A1 | 1/2007 | Kikuchi |
| 2007/0033645 A1 | 2/2007 | Jones |
| 2007/0038943 A1 | 2/2007 | FitzGerald et al. |
| 2007/0064689 A1 | 3/2007 | Shin et al. |
| 2007/0074169 A1 | 3/2007 | Chess et al. |
| 2007/0094730 A1 | 4/2007 | Bhikkaji et al. |
| 2007/0101435 A1 | 5/2007 | Konanka et al. |
| 2007/0128855 A1 | 6/2007 | Cho et al. |
| 2007/0142030 A1 | 6/2007 | Sinha et al. |
| 2007/0143827 A1 | 6/2007 | Nicodemus et al. |
| 2007/0156895 A1 | 7/2007 | Vuong |
| 2007/0157180 A1 | 7/2007 | Tillmann et al. |
| 2007/0157306 A1 | 7/2007 | Elrod et al. |
| 2007/0168988 A1 | 7/2007 | Eisner et al. |
| 2007/0171824 A1 | 7/2007 | Ruello et al. |
| 2007/0174915 A1 | 7/2007 | Gribble et al. |
| 2007/0192500 A1 | 8/2007 | Lum |
| 2007/0192858 A1 | 8/2007 | Lum |
| 2007/0198275 A1 | 8/2007 | Malden et al. |
| 2007/0208822 A1 | 9/2007 | Wang et al. |
| 2007/0220607 A1 | 9/2007 | Sprosts et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0256132 A2 | 11/2007 | Oliphant |
| 2007/0271446 A1 | 11/2007 | Nakamura |
| 2008/0005782 A1 | 1/2008 | Aziz |
| 2008/0018122 A1 | 1/2008 | Zierler et al. |
| 2008/0028463 A1 | 1/2008 | Dagon et al. |
| 2008/0040710 A1 | 2/2008 | Chiriac |
| 2008/0046781 A1 | 2/2008 | Childs et al. |
| 2008/0066179 A1 | 3/2008 | Liu |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0086720 A1 | 4/2008 | Lekel |
| 2008/0098476 A1 | 4/2008 | Syversen |
| 2008/0120722 A1 | 5/2008 | Sima et al. |
| 2008/0134178 A1 | 6/2008 | Fitzgerald et al. |
| 2008/0134334 A1 | 6/2008 | Kim et al. |
| 2008/0141376 A1 | 6/2008 | Clausen et al. |
| 2008/0181227 A1 | 7/2008 | Todd |
| 2008/0184367 A1 | 7/2008 | McMillan et al. |
| 2008/0184373 A1 | 7/2008 | Traut et al. |
| 2008/0189787 A1 | 8/2008 | Arnold et al. |
| 2008/0201778 A1 | 8/2008 | Guo et al. |
| 2008/0209557 A1 | 8/2008 | Herley et al. |
| 2008/0215742 A1 | 9/2008 | Goldszmidt et al. |
| 2008/0222729 A1 | 9/2008 | Chen et al. |
| 2008/0263665 A1 | 10/2008 | Ma et al. |
| 2008/0295172 A1 | 11/2008 | Bohacek |
| 2008/0301810 A1 | 12/2008 | Lehane et al. |
| 2008/0307524 A1 | 12/2008 | Singh et al. |
| 2008/0313738 A1 | 12/2008 | Enderby |
| 2008/0320594 A1 | 12/2008 | Jiang |
| 2009/0003317 A1 | 1/2009 | Kasralikar et al. |
| 2009/0007100 A1 | 1/2009 | Field et al. |
| 2009/0013408 A1 | 1/2009 | Schipka |
| 2009/0031423 A1 | 1/2009 | Liu et al. |
| 2009/0036111 A1 | 2/2009 | Danford et al. |
| 2009/0037835 A1 | 2/2009 | Goldman |
| 2009/0044024 A1 | 2/2009 | Oberheide et al. |
| 2009/0044274 A1 | 2/2009 | Budko et al. |
| 2009/0064332 A1 | 3/2009 | Porras et al. |
| 2009/0077666 A1 | 3/2009 | Chen et al. |
| 2009/0083369 A1 | 3/2009 | Marmor |
| 2009/0083855 A1 | 3/2009 | Apap et al. |
| 2009/0089879 A1 | 4/2009 | Wang et al. |
| 2009/0094600 A1* | 4/2009 | Sargaison ............... G06F 8/61 717/177 |
| 2009/0094697 A1 | 4/2009 | Provos et al. |
| 2009/0113425 A1 | 4/2009 | Ports et al. |
| 2009/0125976 A1 | 5/2009 | Wassermann et al. |
| 2009/0126015 A1 | 5/2009 | Monastyrsky et al. |
| 2009/0126016 A1 | 5/2009 | Sobko et al. |
| 2009/0133125 A1 | 5/2009 | Choi et al. |
| 2009/0144823 A1 | 6/2009 | Lamastra et al. |
| 2009/0158430 A1 | 6/2009 | Borders |
| 2009/0172815 A1 | 7/2009 | Gu et al. |
| 2009/0187992 A1 | 7/2009 | Poston |
| 2009/0193293 A1 | 7/2009 | Stolfo et al. |
| 2009/0198651 A1 | 8/2009 | Shiffer et al. |
| 2009/0198670 A1 | 8/2009 | Shiffer et al. |
| 2009/0198689 A1 | 8/2009 | Frazier et al. |
| 2009/0199274 A1 | 8/2009 | Frazier et al. |
| 2009/0199296 A1 | 8/2009 | Xie et al. |
| 2009/0228233 A1 | 9/2009 | Anderson et al. |
| 2009/0241187 A1 | 9/2009 | Troyansky |
| 2009/0241190 A1 | 9/2009 | Todd et al. |
| 2009/0265692 A1 | 10/2009 | Godefroid et al. |
| 2009/0271867 A1 | 10/2009 | Zhang |
| 2009/0300415 A1 | 12/2009 | Zhang et al. |
| 2009/0300761 A1 | 12/2009 | Park et al. |
| 2009/0328185 A1 | 12/2009 | Berg et al. |
| 2009/0328221 A1 | 12/2009 | Blumfield et al. |
| 2010/0005146 A1 | 1/2010 | Drako et al. |
| 2010/0011205 A1 | 1/2010 | McKenna |
| 2010/0017546 A1 | 1/2010 | Poo et al. |
| 2010/0030996 A1 | 2/2010 | Butler, II |
| 2010/0031353 A1 | 2/2010 | Thomas et al. |
| 2010/0037314 A1 | 2/2010 | Perdisci et al. |
| 2010/0043073 A1 | 2/2010 | Kuwamura |

(56) References Cited

U.S. PATENT DOCUMENTS

| | | |
|---|---|---|
| 2010/0054278 A1 | 3/2010 | Stolfo et al. |
| 2010/0058474 A1 | 3/2010 | Hicks |
| 2010/0064044 A1 | 3/2010 | Nonoyama |
| 2010/0077481 A1 | 3/2010 | Polyakov et al. |
| 2010/0083376 A1 | 4/2010 | Pereira et al. |
| 2010/0115621 A1 | 5/2010 | Staniford et al. |
| 2010/0132038 A1 | 5/2010 | Zaitsev |
| 2010/0154056 A1 | 6/2010 | Smith et al. |
| 2010/0180344 A1 | 7/2010 | Malyshev et al. |
| 2010/0192223 A1 | 7/2010 | Ismael et al. |
| 2010/0220863 A1 | 9/2010 | Dupaquis et al. |
| 2010/0235831 A1 | 9/2010 | Dittmer |
| 2010/0251104 A1 | 9/2010 | Massand |
| 2010/0281102 A1 | 11/2010 | Chinta et al. |
| 2010/0281541 A1 | 11/2010 | Stolfo et al. |
| 2010/0281542 A1 | 11/2010 | Stolfo et al. |
| 2010/0287260 A1 | 11/2010 | Peterson et al. |
| 2010/0299754 A1 | 11/2010 | Amit et al. |
| 2010/0306173 A1 | 12/2010 | Frank |
| 2011/0004737 A1 | 1/2011 | Greenebaum |
| 2011/0025504 A1 | 2/2011 | Lyon et al. |
| 2011/0041179 A1 | 2/2011 | St Hlberg |
| 2011/0047594 A1 | 2/2011 | Mahaffey et al. |
| 2011/0047620 A1 | 2/2011 | Mahaffey et al. |
| 2011/0055907 A1 | 3/2011 | Narasimhan et al. |
| 2011/0078794 A1 | 3/2011 | Manni et al. |
| 2011/0093951 A1 | 4/2011 | Aziz |
| 2011/0099620 A1 | 4/2011 | Stavrou et al. |
| 2011/0099633 A1 | 4/2011 | Aziz |
| 2011/0099635 A1 | 4/2011 | Silberman et al. |
| 2011/0113231 A1 | 5/2011 | Kaminsky |
| 2011/0145918 A1 | 6/2011 | Jung et al. |
| 2011/0145920 A1 | 6/2011 | Mahaffey et al. |
| 2011/0145934 A1 | 6/2011 | Abramovici et al. |
| 2011/0167493 A1 | 7/2011 | Song et al. |
| 2011/0167494 A1 | 7/2011 | Bowen et al. |
| 2011/0173213 A1 | 7/2011 | Frazier et al. |
| 2011/0173460 A1 | 7/2011 | Ito et al. |
| 2011/0219449 A1 | 9/2011 | St. Neitzel et al. |
| 2011/0219450 A1 | 9/2011 | McDougal et al. |
| 2011/0219451 A1* | 9/2011 | McDougal ............ G06F 21/562 726/23 |
| 2011/0225624 A1 | 9/2011 | Sawhney et al. |
| 2011/0225655 A1 | 9/2011 | Niemela et al. |
| 2011/0247072 A1* | 10/2011 | Staniford ............ H04L 63/1416 726/24 |
| 2011/0265182 A1 | 10/2011 | Peinado et al. |
| 2011/0289582 A1 | 11/2011 | Kejriwal et al. |
| 2011/0302587 A1 | 12/2011 | Nishikawa et al. |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2012/0023593 A1 | 1/2012 | Puder et al. |
| 2012/0054869 A1 | 3/2012 | Yen et al. |
| 2012/0066698 A1 | 3/2012 | Yanoo |
| 2012/0079596 A1 | 3/2012 | Thomas et al. |
| 2012/0084859 A1 | 4/2012 | Radinsky et al. |
| 2012/0096553 A1 | 4/2012 | Srivastava et al. |
| 2012/0110667 A1 | 5/2012 | Zubrilin et al. |
| 2012/0117652 A1 | 5/2012 | Manni et al. |
| 2012/0121154 A1 | 5/2012 | Xue et al. |
| 2012/0124426 A1 | 5/2012 | Maybee et al. |
| 2012/0174186 A1 | 7/2012 | Aziz et al. |
| 2012/0174196 A1 | 7/2012 | Bhogavilli et al. |
| 2012/0174218 A1 | 7/2012 | McCoy et al. |
| 2012/0198279 A1 | 8/2012 | Schroeder |
| 2012/0210423 A1 | 8/2012 | Friedrichs et al. |
| 2012/0222121 A1 | 8/2012 | Staniford et al. |
| 2012/0255015 A1 | 10/2012 | Sahita et al. |
| 2012/0255017 A1 | 10/2012 | Sallam |
| 2012/0260342 A1 | 10/2012 | Dube et al. |
| 2012/0266244 A1 | 10/2012 | Green et al. |
| 2012/0278886 A1 | 11/2012 | Luna |
| 2012/0297489 A1 | 11/2012 | Dequevy |
| 2012/0330801 A1 | 12/2012 | McDougal et al. |
| 2012/0331553 A1 | 12/2012 | Aziz et al. |
| 2013/0014259 A1 | 1/2013 | Gribble et al. |
| 2013/0036472 A1 | 2/2013 | Aziz |
| 2013/0047257 A1 | 2/2013 | Aziz |
| 2013/0074185 A1 | 3/2013 | McDougal et al. |
| 2013/0086684 A1 | 4/2013 | Mohler |
| 2013/0097699 A1 | 4/2013 | Balupari et al. |
| 2013/0097706 A1 | 4/2013 | Titonis et al. |
| 2013/0111587 A1 | 5/2013 | Goel et al. |
| 2013/0117849 A1* | 5/2013 | Golshan ................ G06F 21/53 726/23 |
| 2013/0117852 A1 | 5/2013 | Stute |
| 2013/0117855 A1 | 5/2013 | Kim et al. |
| 2013/0139264 A1 | 5/2013 | Brinkley et al. |
| 2013/0160125 A1 | 6/2013 | Likhachev et al. |
| 2013/0160127 A1 | 6/2013 | Jeong et al. |
| 2013/0160130 A1 | 6/2013 | Mendelev et al. |
| 2013/0160131 A1 | 6/2013 | Madou et al. |
| 2013/0167236 A1 | 6/2013 | Sick |
| 2013/0174214 A1 | 7/2013 | Duncan |
| 2013/0174258 A1* | 7/2013 | Livshits ................ G06F 21/566 726/24 |
| 2013/0185789 A1 | 7/2013 | Hagiwara et al. |
| 2013/0185795 A1 | 7/2013 | Winn et al. |
| 2013/0185798 A1 | 7/2013 | Saunders et al. |
| 2013/0191915 A1 | 7/2013 | Antonakakis et al. |
| 2013/0196649 A1 | 8/2013 | Paddon et al. |
| 2013/0227691 A1 | 8/2013 | Aziz et al. |
| 2013/0246370 A1 | 9/2013 | Bartram et al. |
| 2013/0247186 A1 | 9/2013 | LeMasters |
| 2013/0263260 A1 | 10/2013 | Mahaffey et al. |
| 2013/0291109 A1 | 10/2013 | Staniford et al. |
| 2013/0298243 A1 | 11/2013 | Kumar et al. |
| 2013/0318038 A1 | 11/2013 | Shiffer et al. |
| 2013/0318073 A1 | 11/2013 | Shiffer et al. |
| 2013/0325791 A1 | 12/2013 | Shiffer et al. |
| 2013/0325792 A1 | 12/2013 | Shiffer et al. |
| 2013/0325871 A1 | 12/2013 | Shiffer et al. |
| 2013/0325872 A1 | 12/2013 | Shiffer et al. |
| 2014/0032875 A1 | 1/2014 | Butler |
| 2014/0053260 A1 | 2/2014 | Gupta et al. |
| 2014/0053261 A1 | 2/2014 | Gupta et al. |
| 2014/0130158 A1 | 5/2014 | Wang et al. |
| 2014/0137180 A1 | 5/2014 | Lukacs et al. |
| 2014/0137190 A1* | 5/2014 | Carey ................ H04L 63/1433 726/3 |
| 2014/0169762 A1 | 6/2014 | Ryu |
| 2014/0179360 A1 | 6/2014 | Jackson et al. |
| 2014/0181131 A1 | 6/2014 | Ross |
| 2014/0189687 A1 | 7/2014 | Jung et al. |
| 2014/0189866 A1 | 7/2014 | Shiffer et al. |
| 2014/0189882 A1 | 7/2014 | Jung et al. |
| 2014/0237600 A1 | 8/2014 | Silberman et al. |
| 2014/0280245 A1 | 9/2014 | Wilson |
| 2014/0283037 A1* | 9/2014 | Sikorski ................ G06F 21/563 726/22 |
| 2014/0283063 A1 | 9/2014 | Thompson et al. |
| 2014/0328204 A1 | 11/2014 | Klotsche et al. |
| 2014/0337836 A1 | 11/2014 | Ismael |
| 2014/0344926 A1 | 11/2014 | Cunningham et al. |
| 2014/0351935 A1 | 11/2014 | Shao et al. |
| 2014/0380473 A1* | 12/2014 | Bu ............ G06F 21/53 726/23 |
| 2014/0380474 A1 | 12/2014 | Paithane et al. |
| 2015/0007312 A1 | 1/2015 | Pidathala et al. |
| 2015/0096022 A1 | 4/2015 | Vincent et al. |
| 2015/0096023 A1 | 4/2015 | Mesdaq et al. |
| 2015/0096024 A1 | 4/2015 | Haq et al. |
| 2015/0096025 A1 | 4/2015 | Ismael |
| 2015/0180886 A1 | 6/2015 | Staniford et al. |
| 2015/0186645 A1 | 7/2015 | Aziz et al. |
| 2015/0220735 A1 | 8/2015 | Paithane et al. |
| 2015/0372980 A1 | 12/2015 | Eyada |
| 2016/0044000 A1 | 2/2016 | Cunningham |
| 2016/0127393 A1 | 5/2016 | Aziz et al. |
| 2016/0191547 A1 | 6/2016 | Zafar et al. |
| 2016/0261612 A1 | 9/2016 | Mesdaq et al. |
| 2016/0285914 A1 | 9/2016 | Singh et al. |

(56) References Cited

U.S. PATENT DOCUMENTS

| | | |
|---|---|---|
| 2016/0301703 A1 | 10/2016 | Aziz |
| 2016/0335110 A1 | 11/2016 | Paithane et al. |
| 2017/0083703 A1 | 3/2017 | Abbasi et al. |

FOREIGN PATENT DOCUMENTS

| | | |
|---|---|---|
| WO | 02/23805 A2 | 3/2002 |
| WO | 0206928 | 11/2003 |
| WO | 2007117636 A2 | 10/2007 |
| WO | 2008041950 A2 | 4/2008 |
| WO | 2011084431 A2 | 7/2011 |
| WO | 2011/112348 A1 | 9/2011 |
| WO | 2012/075336 A1 | 6/2012 |
| WO | 2012145066 A1 | 10/2012 |
| WO | 2013/067505 A1 | 5/2013 |

OTHER PUBLICATIONS

"Network Security: NetDetector—Network Intrusion Forensic System (NIFS) Whitepaper", ("NetDetector Whitepaper"), (2003).

"Packet", Microsoft Computer Dictionary, Microsoft Press, (Mar. 2002), 1 page.

"When Virtual is Better Than Real", IEEEXplore Digital Library, available at, http://ieeexplore.ieee.org/xpl/articleDetails.isp?reload=true&arnumbe- r=990073, (Dec. 7, 2013).

Abdullah, et al., Visualizing Network Data for Intrusion Detection, 2005 IEEE Workshop on Information Assurance and Security, pp. 100-108.

Adetoye, Adedayo, et al., "Network Intrusion Detection & Response System", ("Adetoye"), (Sep. 2003).

AltaVista Advanced Search Results. "attack vector identifier". Http://www.altavista.com/web/results?ltag=ody&pg=aq&aqmode=aqa=Event+Orch- estrator . . . , (Accessed on Sep. 15, 2009).

AltaVista Advanced Search Results. "Event Orchestrator". Http://www.altavista.com/web/results?ltag=ody&pg=aq&aqmode=aqa=Event+Orch- esrator . . . , (Accessed on Sep. 3, 2009).

Apostolopoulos, George; hassapis, Constantinos; "V-eM: A cluster of Virtual Machines for Robust, Detailed, and High-Performance Network Emulation", 14th IEEE International Symposium on Modeling, Analysis, and Simulation of Computer and Telecommunication Systems, Sep. 11-14, 2006, pp. 117-126.

Aura, Tuomas, "Scanning electronic documents for personally identifiable information", Proceedings of the 5th ACM workshop on Privacy in electronic society. ACM, 2006.

Baecher, "The Nepenthes Platform: An Efficient Approach to collect Malware", Springer-verlag Berlin Heidelberg, (2006), pp. 165-184.

Baldi, Mario; Risso, Fulvio; "A Framework for Rapid Development and Portable Execution of Packet-Handling Applications", 5th IEEE International Symposium Processing and Information Technology, Dec. 21, 2005, pp. 233-238.

Bayer, et al., "Dynamic Analysis of Malicious Code", J Comput Virol, Springer-Verlag, France., (2006), pp. 67-77.

Boubalos, Chris, "extracting syslog data out of raw pcap dumps, seclists.org, Honeypots mailing list archives", available at http://seclists.org/honeypots/2003/q2/319 ("Boubalos"), (Jun. 5, 2003).

Chaudet, C., et al., "Optimal Positioning of Active and Passive Monitoring Devices", International Conference on Emerging Networking Experiments and Technologies, Proceedings of the 2005 ACM Conference on Emerging Network Experiment and Technology, CoNEXT '05, Toulousse, France, (Oct. 2005), pp. 71-82.

Chen, P. M. and Noble, B. D., "When Virtual is Better Than Real, Department of Electrical Engineering and Computer Science", University of Michigan ("Chen") (2001).

Cisco "Intrusion Prevention for the Cisco ASA 5500-x Series" Data Sheet (2012).

Cisco, Configuring the Catalyst Switched Port Analyzer (SPAN) ("Cisco"), (1992).

Clark, John, Sylvian Leblanc,and Scott Knight. "Risks associated with usb hardware trojan devices used by insiders." Systems Conference (SysCon), 2011 IEEE International. IEEE, 2011.

Cohen, M.I., "PyFlag—An advanced network forensic framework", Digital investigation 5, Elsevier, (2008), pp. S112-S120.

Costa, M., et al., "Vigilante: End-to-End Containment of Internet Worms", SOSP '05, Association for Computing Machinery, Inc., Brighton U.K., (Oct. 23-26, 2005).

Crandall, J.R., et al., "Minos:Control Data Attack Prevention Orthogonal to Memory Model", 37th International Symposium on Microarchitecture, Portland, Oregon, (Dec. 2004).

Deutsch, P., "Zlib compressed data format specification version 3.3" RFC 1950, (1996).

Distler, "Malware Analysis: An Introduction", SANS Institute InfoSec Reading Room, SANS Institute, (2007).

Dunlap, George W., et al., "ReVirt: Enabling Intrusion Analysis through Virtual-Machine Logging and Replay", Proceeding of the 5th Symposium on Operating Systems Design and Implementation, USENIX Association, ("Dunlap"), (Dec. 9, 2002).

Excerpt regarding First Printing Date for Merike Kaeo, Designing Network Security ("Kaeo"), (2005).

Filiol, Eric, et al., "Combinatorial Optimisation of Worm Propagation on an Unknown Network", International Journal of Computer Science 2.2 (2007).

FireEye Malware Analysis & Exchange Network, Malware Protection System, FireEye Inc., 2010.

FireEye Malware Analysis, Modern Malware Forensics, FireEye Inc., 2010.

FireEye v.6.0 Security Target, pp. 1-35, Version 1.1, FireEye Inc., May 2011.

Gibler, Clint, et al. AndroidLeaks: automatically detecting potential privacy leaks in android applications on a large scale. Springer Berlin Heidelberg, 2012.

Goel, et al., Reconstructing System State for Intrusion Analysis, Apr. 2008 SIGOPS Operating Systems Review, vol. 42 Issue 3, pp. 21-28.

Gregg Keizer: "Microsoft's HoneyMonkeys Show Patching Windows Works", Aug. 8, 2005, XP055143386, Retrieved from the Internet: URL:http://www.informationweek.com/microsofts-honeymonkeys-show-patching-windows-works/d/d-id/1035069? [retrieved on Jun. 1, 2016].

Heng Yin et al, Panorama: Capturing System-Wide Information Flow for Malware Detection and Analysis, Research Showcase @ CMU, Carnegie Mellon University, 2007.

Hjelmvik, Erik, "Passive Network Security Analysis with NetworkMiner", (IN)Secure, Issue 18, (Oct. 2008), pp. 1-100.

Idika et al., A-Survey-of-Malware-Detection-Techniques, Feb. 2, 2007, Department of Computer Science, Purdue University.

IEEE Xplore Digital Library Sear Results for "detection of unknown computer worms". Http//ieeexplore.ieee.org/searchresult.jsp?SortField=Score&SortOrder=desc- &ResultC . . . , (Accessed on Aug. 28, 2009).

Isohara, Takamasa, Keisuke Takemori, and Ayumu Kubota. "Kernel-based behavior analysis for android malware detection." Computational intelligence and Security (CIS), 2011 Seventh International Conference on. IEEE, 2011.

Kaeo, Merike, "Designing Network Security", ("Kaeo"), (Nov. 2003).

Kevin A Roundy et al: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.

Kim, H., et al., "Autograph: Toward Automated, Distributed Worm Signature Detection", Proceedings of the 13th Usenix Security Symposium (Security 2004), San Diego, (Aug. 2004), pp. 271-286.

King, Samuel T., et al., "Operating System Support for Virtual Machines", ("King") (2003).

Krasnyansky, Max, et al., Universal TUN/TAP driver, available at https://www.kernel.org/doc/Documentation/networking/tuntap.txt (2002) ("Krasnyansky").

Kreibich, C., et al., "Honeycomb-Creating Intrusion Detection Signatures Using Honeypots", 2nd Workshop on Hot Topics in Networks (HotNets-11), Boston, USA, (2003).

(56) References Cited

OTHER PUBLICATIONS

Kristoff, J. , "Botnets, Detection and Mitigation: DNS-Based Techniques", NU Security Day, (2005), 23 pages.

Leading Colleges Select FireEye to Stop Malware-Related Data Breaches, FireEye Inc., 2009.

Li et al., A VMM-Based System Call Interposition Framework for Program Monitoring, Dec. 2010, IEEE 16th International Conference on Parallel and Distributed Systems, pp. 706-711.

Liljenstam, Michael , et al., "Simulating Realistic Network Traffic for Worm Warning System Design and Testing", Institute for Security Technology studies, Dartmouth College ("Liljenstam"), (Oct. 27, 2003).

Lindorfer, Martina, Clemens Kolbitsch, and Paolo Milani Comparetti. "Detecting environment-sensitive malware." Recent Advances in Intrusion Detection. Springer Berlin Heidelberg, 2011.

Lok Kwong et al: "DroidScope: Seamlessly Reconstructing the OS and Dalvik Semantic Views for Dynamic Android Malware Analysis", Aug. 10, 2012, XP055158513, Retrieved from the Internet: URL:https://www.usenix.org/system/files/conference/usenixsecurity12/sec12- -final107.pdf [retrieved on Dec. 15, 2014].

PCT/US2016/061361 filed Nov. 10, 2016 International Search Report and Written Opinion dated Jan. 30, 2017.

U.S. Appl. No. 13/801,557, filed Mar. 13, 2013 Final Office Action dated May 28, 2015.

U.S. Appl. No. 13/801,557, filed Mar. 13, 2013 Non-Final Office Action dated Feb. 5, 2016.

U.S. Appl. No. 13/801,557, filed Mar. 13, 2013 Non-Final Office Action dated Nov. 17, 2014.

Marchette, David J., "Computer Intrusion Detection and Network Monitoring: A Statistical Viewpoint", ("Marchette"), (2001).

Margolis, P.E. , "Random House Webster's 'Computer & Internet Dictionary 3rd Edition'", ISBN 0375703519, (Dec. 1998).

Moore, D. , et al., "Internet Quarantine: Requirements for Containing Self-Propagating Code", INFOCOM, vol. 3, (Mar. 30-Apr. 3, 2003), pp. 1901-1910.

Morales, Jose A., et al., ""Analyzing and exploiting network behaviors of malware."", Security and Privacy in Communication Networks. Springer Berlin Heidelberg, 2010. 20-34.

Mori, Detecting Unknown Computer Viruses, 2004, Springer-Verlag Berlin Heidelberg.

Natvig, Kurt , "SANDBOXII: Internet", Virus Bulletin Conference, ("Natvig"), (Sep. 2002).

NetBIOS Working Group. Protocol Standard for a NetBIOS Service on a TCP/UDP transport: Concepts and Methods. STD 19, RFC 1001, Mar. 1987.

Newsome, J. , et al., "Dynamic Taint Analysis for Automatic Detection, Analysis, and Signature Generation of Exploits on Commodity Software", In Proceedings of the 12th Annual Network and Distributed System Security, Symposium (NDSS '05), (Feb. 2005).

Newsome, J. , et al., "Polygraph: Automatically Generating Signatures for Polymorphic Worms", In Proceedings of the IEEE Symposium on Security and Privacy, (May 2005).

Nojiri, D. , et al., "Cooperation Response Strategies for Large Scale Attack Mitigation", DARPA Information Survivability Conference and Exposition, vol. 1, (Apr. 22-24, 2003), pp. 293-302.

Oberheide et al., CloudAV.sub.—N-Version Antivirus in the Network Cloud, 17th USENIX Security Symposium USENIX Security '08 Jul. 28-Aug. 1, 2008 San Jose, CA.

Reiner Sailer, Enriquillo Valdez, Trent Jaeger, Roonald Perez, Leendert van Doom, John Linwood Griffin, Stefan Berger., sHype: Secure Hypervisor Appraoch to Trusted Virtualized Systems (Feb. 2, 2005) ("Sailer").

Silicon Defense, "Worm Containment in the Internal Network", (Mar. 2003), pp. 1-25.

Singh, S. , et al., "Automated Worm Fingerprinting", Proceedings of the ACM/USENIX Symposium on Operating System Design and Implementation, San Francisco, California, (Dec. 2004).

Spitzner, Lance , "Honeypots: Tracking Hackers", ("Spizner"), (Sep. 17, 2002).

The Sniffers's Guide to Raw Traffic available at: yuba.stanford.edu/.about.casado/pcap/section1.html, (Jan. 6, 2014).

Thomas H. Ptacek, and Timothy N. Newsham , "Insertion, Evasion, and Denial of Service: Eluding Network Intrusion Detection", Secure Networks, ("Ptacek"), (Jan. 1998).

U.S. Pat. No. 8,171,553 filed Apr. 20, 2006, Inter Parties Review Decision dated Jul. 10, 2015.

U.S. Pat. No. 8,291,499 filed Mar. 16, 2012, Inter Parties Review Decision dated Jul. 10, 2015.

Venezia, Paul , "NetDetector Captures Intrusions", InfoWorld Issue 27, ("Venezia"), (Jul. 14, 2003).

Wahid et al., Characterising the Evolution in Scanning Activity of Suspicious Hosts, Oct. 2009, Third International Conference on Network and System Security, pp. 344-350.

Whyte, et al., "DNS-Based Detection of Scanning Works in an Enterprise Network", Proceedings of the 12th Annual Network and Distributed System Security Symposium, (Feb. 2005), 15 pages.

Williamson, Matthew M., "Throttling Viruses: Restricting Propagation to Defeat Malicious Mobile Code", ACSAC Conference, Las Vegas, NV, USA, (Dec. 2002), pp. 1-9.

Yuhei Kawakoya et al: "Memory behavior-based automatic malware unpacking in stealth debugging environment", Malicious and Unwanted Software (Malware), 2010 5th International Conference on, IEEE, Piscataway, NJ, USA, Oct. 19, 2010, pp. 39-46, XP031833827, ISBN:978-1-4244-8-9353-1.

Zhang et al., The Effects of Threading, Infection Time, and Multiple-Attacker Collaboration on Malware Propagation, Sep. 2009, IEEE 28th International Symposium on Reliable Distributed Systems, pp. 73-82.

\* cited by examiner

LAUNCHER FOR SETTING ANALYSIS ENVIRONMENT VARIATIONS FOR MALWARE DETECTION

FIELD

Embodiments of the disclosure relate to cyber security. More particularly, embodiments of the disclosure related to an electronic device and method directed toward malware analysis using multiple software applications and multiple plug-ins, where the combination of software applications and plug-ins is dynamic.

GENERAL BACKGROUND

Over the last decade, network devices that access the Internet or other publicly accessible networks have been increasingly targeted for malicious attack. These malicious attacks may simply involve the use of stolen credentials by an unauthorized person in efforts to gain unauthorized access to information stored within a network device. However, other malicious attacks may be more complex.

In general, one type of malicious attack is an exploit attack. An exploit attack is an attempt, normally through unsuspecting uploading of an exploit (e.g., software, data, command(s), etc.) to take advantage of a vulnerability in a targeted computer by adversely influencing or attacking normal operations of that computer. Typically, exploit attacks are directed to a vulnerability associated with a specific application (e.g., browser application, document reader application (such as a portable document format "PDF" reader), Microsoft® Office® or another type of data processing application, etc.) or a vulnerability found in a specific plug-in associated with the application (e.g., Flash™ plug-in, Java® runtime environment ("JRE"), etc.).

Another type of malicious attack may involve the insertion of malicious software into a computer or another type of computing device. The malicious software may include any program or file that is harmful by design to the computing device. The malicious software may include computer viruses, worms, Trojan horses, adware, spyware, and any programming that gathers or attempts to steal information from a computer or about its user or otherwise operates without permission. The owners of the computers are often unaware that these programs have been added to their computers and are often similarly unaware of their function.

Various processes and devices have been employed to prevent malicious attacks and other security threats. For example, computers often run antivirus scanning software that scans a particular computer for viruses and other forms of malware. The scanning typically involves automatic detection of a match between content stored on the computer (or attached media) and a library or database of signatures of known malware. However, this type of static analysis produces a number of false negatives, as detection is solely dependent on the presence of generated signatures, which may not be available until weeks or months after initial detection of a particular type of malware.

Another type of threat detection solution employs virtual machine instances (VMs) to replay the processing of an object within a sandbox established by those VMs. This solution monitors the behavior of the object during processing within a VM and may signal that the object (e.g., uniform resource locator, a file, etc.) is associated with a malicious attack in response to detecting anomalous behavior(s). One such system offered by FireEye, Inc., the assignee of the present patent application, employs a two-phase malware detection approach to detect malware contained in network traffic monitored in real-time. In a first or "static" phase, a heuristic is applied to an object that appears to be "suspicious" by exhibiting characteristics associated with malware. In a second or "dynamic" phase, the suspicious objects are processed within one or more virtual machines and in accordance with a specific version of an application or multiple versions of that application. Although the two-phase, malware detection solution may offer concurrent processing of two or more versions of an application in order to achieve significant reduction of false positives while limited time for analysis, this analysis may not take into account the totality of the software environment when analyzing the content for malware.

BRIEF DESCRIPTION OF THE DRAWINGS

Embodiments of the disclosure are illustrated by way of example and not by way of limitation in the figures of the accompanying drawings, in which like references indicate similar elements and in which.

DETAILED DESCRIPTION

Figure 1:
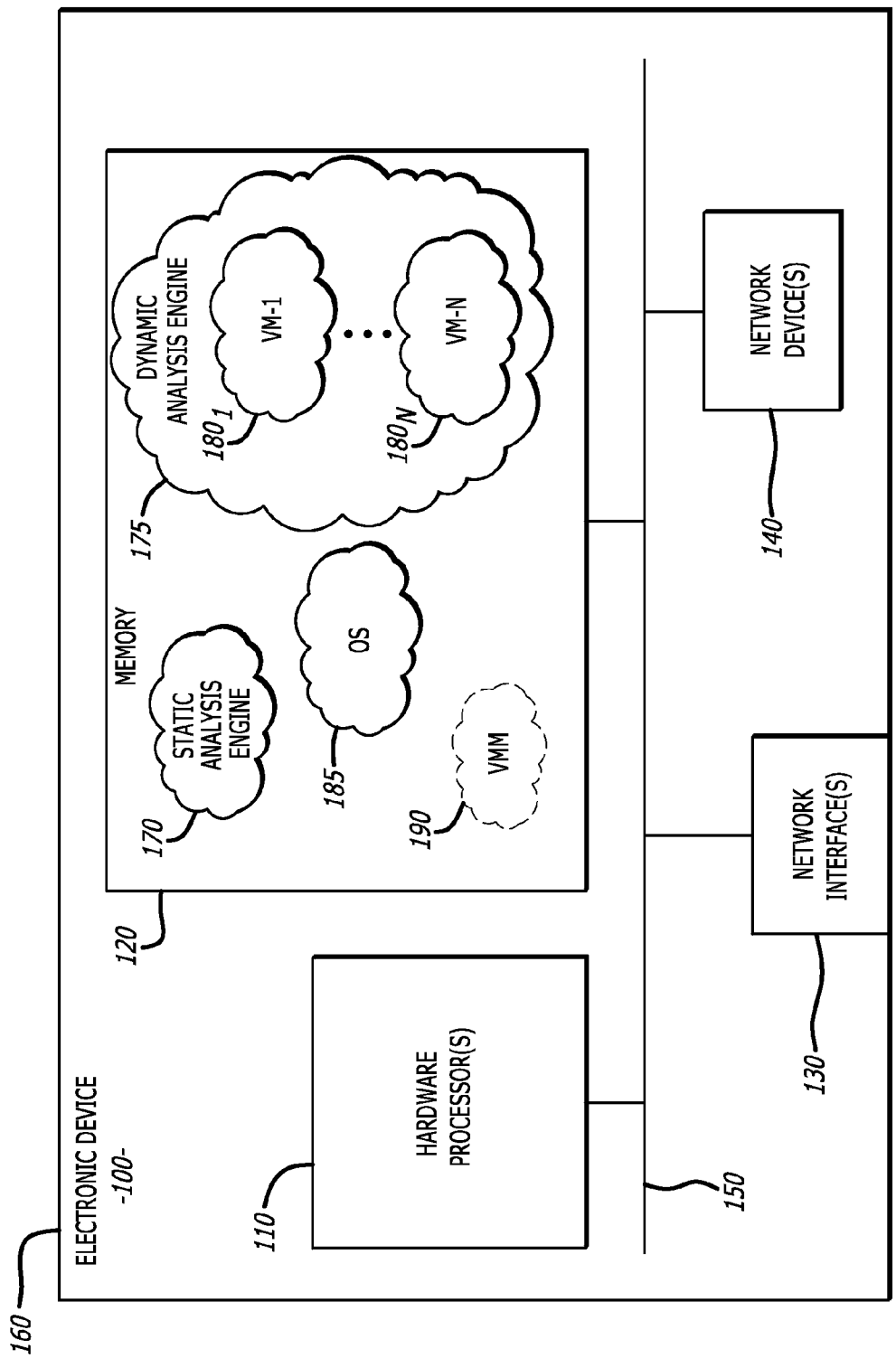
FIG. 1 is an exemplary block diagram of a physical representation of an electronic device with threat detection system deployed therein.

Various embodiments of the disclosure are directed to a malware detection system for multiple application ("multi-app"), multiple plug-in ("multi-plugin") analysis of a suspicious object within a sandbox environment, where the suspicious object may include one or more data elements (e.g., files, documents, etc.) and/or one or more uniform resource locators (URLs). Herein, the sandbox environment features one or more virtual machines, each virtual machine includes launcher logic that is responsible for setting an analysis environment variation framework for analysis of a suspicious object for malware. The analysis environment variation framework, referred to herein as a "multi-app, multi-plugin processing framework," includes multiple application/plug-in combinations that, when launched, process the suspicious object concurrently (i.e. overlapping at least in part in time) in the virtual machine. During processing of the suspicious object, the behaviors of these application/plug-in combinations are monitored and analyzed to determine whether the suspicious object is associated with a malicious attack.

The setting of the multi-app, multi-plugin processing framework may be based, at least in part, on the type of object for analysis and received configuration data. The configuration data includes one or more priority lists (hereinafter "priority list(s)") that, for each object type, provides a prescribed order of execution for applications (and/or application/plug-in combinations) on an application basis and/or a plug-in basis. The configuration data may further provide information to control how and when the given object (e.g., file or URL) is processed using multiple versions of an application. For example, a delay between commencement in the processing of a suspicious object by one application/plug-in combination and another application/plug-in combination can change dynamically. Also, the processing of the suspicious object may be halted when sufficient indicators are observed, so that VM analysis time can be conserved.

The adjustment and substitution of different plug-in combinations provides a secondary variance to a multiple application malware detection analysis. Depending on the object type and the selected applications (and version), the plug-in types may be changed so that different versions of applications that process the suspicious object with the VMs also utilize different plug-ins or different plug-in combinations. This plug-in multiplexing enables a threat detection system to be dynamically programmable, which allows the system to mimic application/plug-in combinations that may be utilized by a targeted customer (e.g., enterprise or other organization protected by the malware detection system) as well as application/plug-in combinations that may be more susceptible to malicious attack or the most fortified (e.g., patched or otherwise updated) application/plug-in combinations—thus providing ability to detect both new and older malicious attacks.

It is contemplated that the priority list(s) may include, besides different versions of a plug-in for a particular application type or version, different versions of an operation system (OS) that may be more susceptible to a malicious attack on a particular application and/or plug-in. Hence, the priority list(s) may feature different OS, application, and/or plug-in combinations. For simplicity, however, the priority list will be described in connection with application/plug-in combinations.

I. Terminology

In the following description, certain terminology is used to describe various features of the invention. For example, the terms "logic," "engine" and "component" are representative of hardware, firmware or software that is configured to perform one or more functions. As hardware, logic (engine/component) may include circuitry having data processing or storage functionality. Examples of such circuitry may include, but are not limited or restricted to a hardware processor (e.g., microprocessor with one or more processor cores, a digital signal processor, a programmable gate array, a microcontroller, an application specific integrated circuit "ASIC", etc.), a semiconductor memory, or combinatorial elements.

Logic (engine/component) may be software such as one or more processes, one or more instances, Application Programming Interface(s) (API), subroutine(s), function(s), applet(s), servlet(s), routine(s), source code, object code, shared library/dynamic link library (dll), or even one or more instructions. This software may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; non-persistent storage such as volatile memory (e.g., any type of random access memory "RAM"); or persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the logic (or engine/component) may be stored in persistent storage.

The term "multi-app" is used to represent multiple versions of an application and/or different applications. Similarly, the term "multi-plugin" is used to represent multiple versions of the same and/or different plug-ins.

The term "object" generally relates to any type of information, including a Uniform Resource Locator (URL) or a data element, which is broadly defined herein as a collection of data, whether in transit (e.g., over a network) or at rest (e.g., stored), often having a logical structure or organization that enables it to be classified for purposes of analysis for malware. Examples of different types of data elements may include a self-contained element, one or more flows, or a self-contained element within a flow itself. A "flow" generally refers to related packets that are received, transmitted, or exchanged within a communication session. For convenience, a packet broadly refers to a series of bits or bytes having a prescribed format. Further, a data element may correspond to a collection of data that may take the form of an individual or a number of packets carrying related payloads, e.g., a single webpage received over a network.

As a self-contained element, the data element may be an executable (e.g., an application, program, segment of code, dynamically link library "dll", etc.) or a non-executable. Examples of non-executables may include a document (e.g., a Portable Document Format "PDF" document, Microsoft® Office® document, Microsoft® Excel® spreadsheet, etc.), an electronic mail (email), downloaded web page, a file retrieved from a storage location over an interconnect, or the like.

The term "electronic device" should be generally construed as electronics with data processing capability and/or a capability of connecting to any type of network, such as a public network (e.g., Internet), a private network (e.g., a wireless data telecommunication network, a local area network "LAN", etc.), or a combination of networks. Examples of an electronic device may include, but are not limited or restricted to, the following: a security appliance that includes any system or subsystem configured to perform functions associated with malware detection on an incoming object; a server, a mainframe, a firewall, a router; or an endpoint device (e.g., a laptop, a smartphone, a tablet, a desktop computer, a netbook, a medical device, or any general-purpose or special-purpose, user-controlled electronic device).

According to one embodiment, the term "malware" may be broadly construed as any content (e.g., code, data, command(s), etc.) or activity that initiates a malicious attack and/or operations associated with anomalous or unwanted behavior. For instance, malware may correspond to a type of malicious computer code intended to harm or co-opt operation of an electronic device or misappropriate, modify or delete data. In the alternative, malware may correspond to an exploit itself, namely (i) content that attempts to take advantage of a vulnerability in software and/or (ii) an action by a person gaining unauthorized access to one or more areas of an electronic device, where the exploit causes the electronic device to experience undesirable or anomalous behaviors. The undesirable or anomalous behaviors may include a communication-based anomaly or an execution-based anomaly which, for example, could (1) alter the functionality of an electronic device in an atypical manner or (2) provide unwanted functionality which may be generally acceptable in another context (e.g., uploading a contact list to cloud storage, but this upload is without receiving permission from the user).

The term "interconnect" may be construed as a physical or logical communication path between two or more electronic devices or between different logic (engine/components). For instance, a physical communication path may include wired or wireless transmission mediums. Examples of wired transmission mediums and wireless transmission mediums may include electrical wiring, optical fiber, cable, bus trace, a radio unit that supports radio frequency (RF) signaling, or any other wired/wireless signal transfer mechanism. A logical communication path may include an inter-process communication (IPC) mechanism that allows for the exchange of content between different logic.

The term "computerized" generally represents that any corresponding operations are conducted by hardware in combination with software or firmware.

The term "plug-in" may be broadly construed as a software component that adds a specific feature or features to another computer program, which is intended to include add-ins, add-ons, or extensions as well. In other words, the operation of a computer program can be altered or customized through incorporation of select individual plug-ins. Typically, a computer program is designed to support plug-ins. Various types of plug-ins, for example, are available for use in popular web browsers to add features such as search-engines, virus scanners, or the ability to open a previously unsupported file type.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

II. General System Architecture

Referring now to FIG. 1, an exemplary block diagram of a physical representation of an electronic device 100 (e.g., security appliance) is shown, where the electronic device 100 is configured with a threat detection system adapted to detect malicious attacks by processing a suspicious object (e.g., uniform resource locator "URL" or a data element) within a virtual machine deployed within the threat detection system. The processing of the suspicious object is conducted in accordance with a plurality of concurrent running processes that are configured in accordance with multi-app, multi-plugin processing framework set within a virtual machine. The multi-app, multi-plugin processing framework features application/plug-in combinations that are selected in accordance with the type of object under analysis, namely different combinations of application instances operating with different versions of plug-ins. For example, the multi-app, multi-plugin processing framework may include, but is not limited or restricted to (i) multiple versions of the same application instance each with a different version of the same plug-in, (ii) multiple versions of the same application instance with different plug-ins, (iii) multiple versions of different application instances each with a different version of the same plug-in, or (iv) multiple versions of different application instances each with different plug-ins.

Herein, the electronic device 100 comprises one or more hardware processors (referred to as "processor(s)") 110, a memory 120, one or more network interfaces (referred to as "network interface(s)") 130, and one or more network devices (referred to as "network device(s)") 140 connected by a system interconnect 150, such as a bus. These components are at least partially encased in a housing 160, which is made entirely or partially of a rigid material (e.g., hardened plastic, metal, glass, composite, or any combination thereof) that protects these components from environmental conditions.

The processor(s) 110 is a multipurpose, programmable component that accepts digital data as input, processes the input data according to stored instructions, and provides results as output. One example of a processor may include an Intel® x86 central processing unit (CPU) with an instruction set architecture. Alternatively, a processor may include another type of CPU, a digital signal processor (DSP), an Application Specific Integrated Circuit (ASIC), a field-programmable gate array (FPGA), or the like. The processor(s) 110 and operating system ("OS") 185 within memory 120 operate as system resources for virtualized hardware that may control operability of one or more virtual machines operating with a dynamic analysis engine, described below.

The network device(s) 140 may include various input/output (I/O) or peripheral devices, such as a keyboard, key pad, touch screen, or mouse for example. Each network interface 130 may include one or more network ports containing the mechanical, electrical and/or signaling circuitry needed to connect the electronic device 100 to a network to thereby facilitate communications to other remotely located electronic devices. To that end, the network interface(s) 130 may be configured to transmit and/or receive messages using a variety of communication protocols including, inter alia, Transmission Control Protocol/Internet Protocol (TCP/IP), Hypertext Transfer Protocol (HTTP), or HTTP Secure (HTTPS).

The memory 120 operates as system memory, provided by non-persistent storage or persistent storage. From a logical perspective, the memory 120 includes a plurality of locations that are addressable by the processor(s) 110 and the network interface(s) 130 for storing logic, including a first analysis engine 170 and a second analysis engine 175. When deployed, the first analysis engine 170 performs a static analysis of a selected object by analyzing its characteristics. The second analysis engine 175 conducts a more in-depth analysis of the object through the use of one or more virtual machines $180_1$-$180_N$ (N≥1), which may be configured in accordance with a selected multi-app, multi-plugin processing framework.

Although not shown, the application/plug-in combinations of the multi-app, multi-plugin processing framework are set based, at least in part, on the type of object being processed. While a virtual machine (e.g., virtual machine $180_1$) is running, the suspicious object is processed concurrently by the application/plug-in combinations and the behaviors of each application/plug-in combination are monitored for analysis. An optional virtual machine monitor (sometimes referred to as a "VMM" or a "hypervisor") 190 may be stored within memory 120 as well.

III. Architecture of the Threat Detection System

Figure 2:
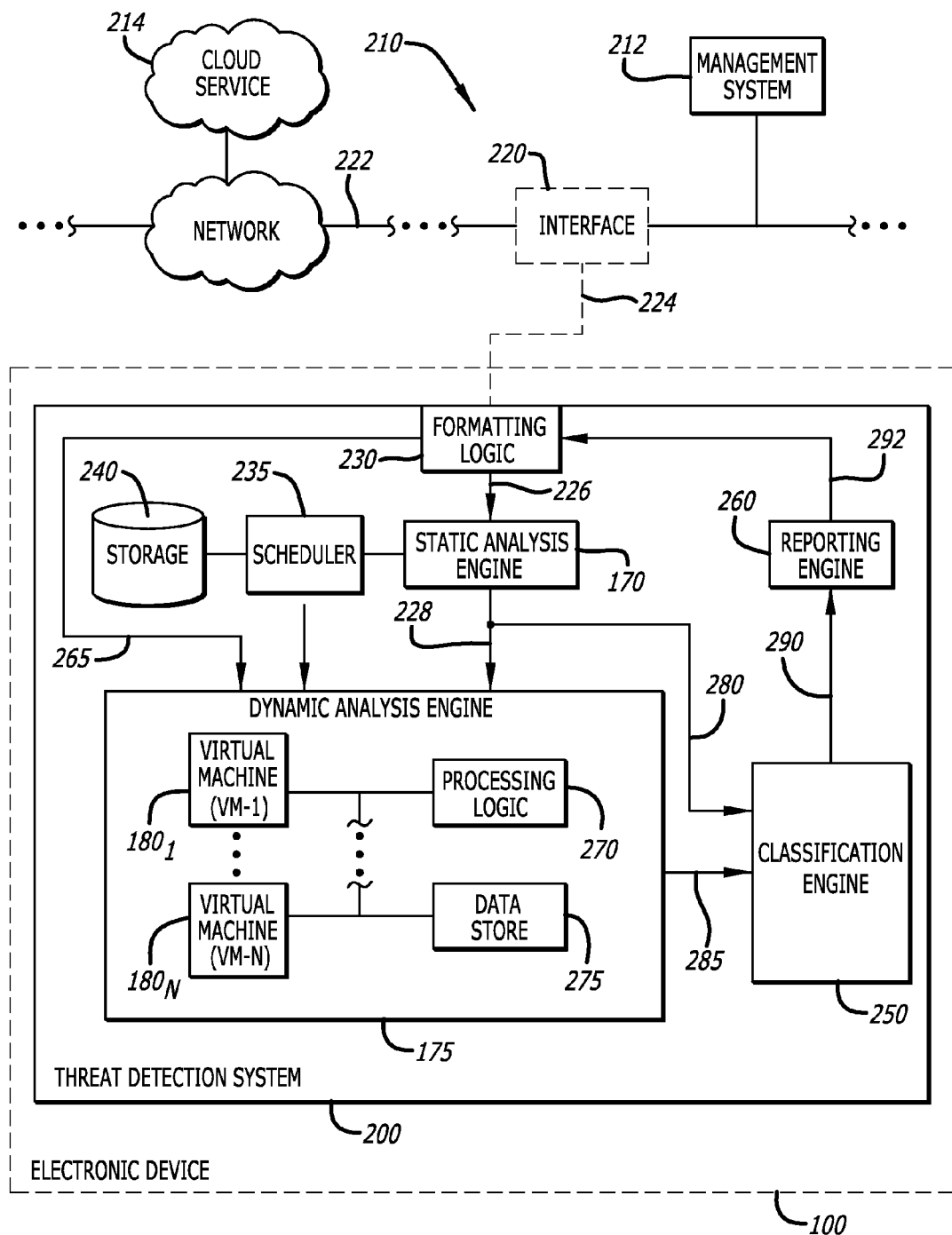
FIG. 2 is an embodiment of the electronic device of FIG. 1 employing a threat detection system.

As shown in FIG. 2, a first embodiment of the electronic device 100 employing a threat detection system 200 is shown. The threat detection system 200 operates within the electronic device 100 and is adapted to analyze an object associated with incoming data from a source physically separated from the electronic device 100. According to this illustrative embodiment, the threat detection system 200 may be communicatively coupled with a communication network 210 via an interface 220, where the communication network 210 may operate as a public network such as the Internet or a private network (e.g., a local area network "LAN", wireless LAN, etc.). The interface 220 receives incoming data 222 as network traffic propagating over the communication network 210. Alternatively, although not shown, the interface 220 may be configured to receive files or other types of data that are not provided over a network. For instance, as an illustrative example, the interface 220 may be a data capturing device that automatically (or on command) accesses data stored in a storage system or another type of interface, such as a port, for receiving objects manually provided via a suitable dedicated communication link or from storage media such as a solid-state drive or flash drive.

Referring to FIG. 2, as shown, the interface 220 operates as a data capturing device that intercepts (or alternatively duplicates) at least a portion of the incoming data 222, namely object 224 for analysis and/or metadata associated with the object 224. The object 224 may include a data element (e.g., a file, a document or another type of formatted data, or a pointer that identifies a path to this stored data) or a Uniform Resource Locator (URL). When supporting a network deployment, the interface 220 may be contained within the electronic device 100 as part of the threat detection system 200 such as a network card or an input port or another interface type. Otherwise, the interface 220 can be integrated into an intermediary device in the communication path (e.g., an optional firewall, router, switch or other networked electronic device) or may be deployed as a standalone component, such as an appropriate commercially available network tap.

For this illustrative embodiment, however, the interface 220 may be configured to capture the object 224 for analysis, and perhaps its corresponding metadata (or generate metadata based on the captured object 224). According to one embodiment of the disclosure, the metadata may be used, at least in part by formatting logic 230, to determine protocols, application types and other information that may be used by logic within the threat detection system 200, such as a scheduler 235 or other logic such as a VMM (not shown), to determine a particular software profile used for virtual machine (VM) configuration and/or VM operation scheduling. As an example, one or more software profiles may be used for initial configuration of guest software of one or more VMs $180_1$-$180_N$ operating within dynamic analysis engine 175. Fetched from a storage device 240, these software profile(s) may be directed to different OS/Service-Packs, where different stored applications (e.g., different versions of the same application type, different application types, etc.), and/or different plug-ins (e.g., different versions of the same plug-in, different plug-in types, etc.) may be provisioned differently within each VM $180_1$-$180_N$. Logic (launcher) within each VM $180_1$, . . . , or $180_N$ may reconfigure the run-time operations to support a selected multi-app, multi-plugin analysis, as described below.

As further shown in FIG. 2, the threat detection system 200 includes the formatting logic 230, the static analysis engine 170, the scheduler 235, the storage device 240, the dynamic analysis engine 175, classification engine 250, and/or reporting engine 260. Herein, according to this embodiment of the disclosure, the formatting logic 230 receives at least the captured object 224 for analysis, and converts that object 224 into a format, if needed or as appropriate, on which scanning may be conducted by the static analysis engine 170. This conversion may involve decompression of the object for example. It is contemplated that the formatting logic 230 may conduct de-compilation, disassembly or other de-obfuscation activities on the captured object 224 to produce a formatted object 226. However, as shown below, the de-obfuscation and data extraction activities may be handled by logic within the static analysis engine 170.

Referring still to FIG. 2, the static analysis engine 170 may analyze information associated with the formatted object 226. Such analysis may include, but is not limited or restricted to, an analysis of the object type and may extract one or more characteristics (hereinafter "characteristic(s)") associated with the formatted object 226, such as the object name, object type, size, path, or the like. According to this embodiment of the disclosure, the extracted characteristic(s) may be provided as static analysis (SA)-based results 280 to the classification engine 250 for subsequent analysis. Additionally or in the alternative, the static analysis engine 170 may analyze the formatted object 226 itself by performing one or more checks. An example of the check may include one or more signature checks, which may involve a comparison of (i) content of the formatted object 226 and (ii) one or more pre-stored signatures associated with detected malware.

It is contemplated that the static analysis engine 170 may further include processing circuitry (not shown) that is responsible for extracting or generating metadata contained within or otherwise associated with formatted object 226 from the formatting logic 230 (e.g., network traffic, downloaded data). This metadata may be subsequently used by the scheduler 235 for initial configuration of one or more VMs $180_1$-$180_N$ within the dynamic analysis engine 175, which conducts run-time processing of at least some of the information associated with the formatted object 226.

Although not shown, for a multiple VM deployment, a first VM $180_1$ and a second VM $180_2$ may be configured to run concurrently, where each of these VMs may be initially configured with different software profiles. As an alternative embodiment, the first VM $180_1$ may be configured to run multiple application instances concurrently or sequentially (e.g., configuration data 265 imposing prescribed run-time delays), each application instance configured according to a selected application/plug-in combination. One of the application/plug-in combinations is selected to mimic an anticipated operating environment supported by one or more electronic devices targeted to receive the incoming data 222. One or more of these VMs, such as the first VM $180_1$ for example, includes logic that is adapted, during run-time, to configure a multi-app, multi-plugin processing framework with at least the application/plug-in combination that mimics the anticipated operating environment. The multi-app, multi-plugin processing framework may be dynamically configured based on the type of object being analyzed and on the contents of configuration data 265.

Figure 3:
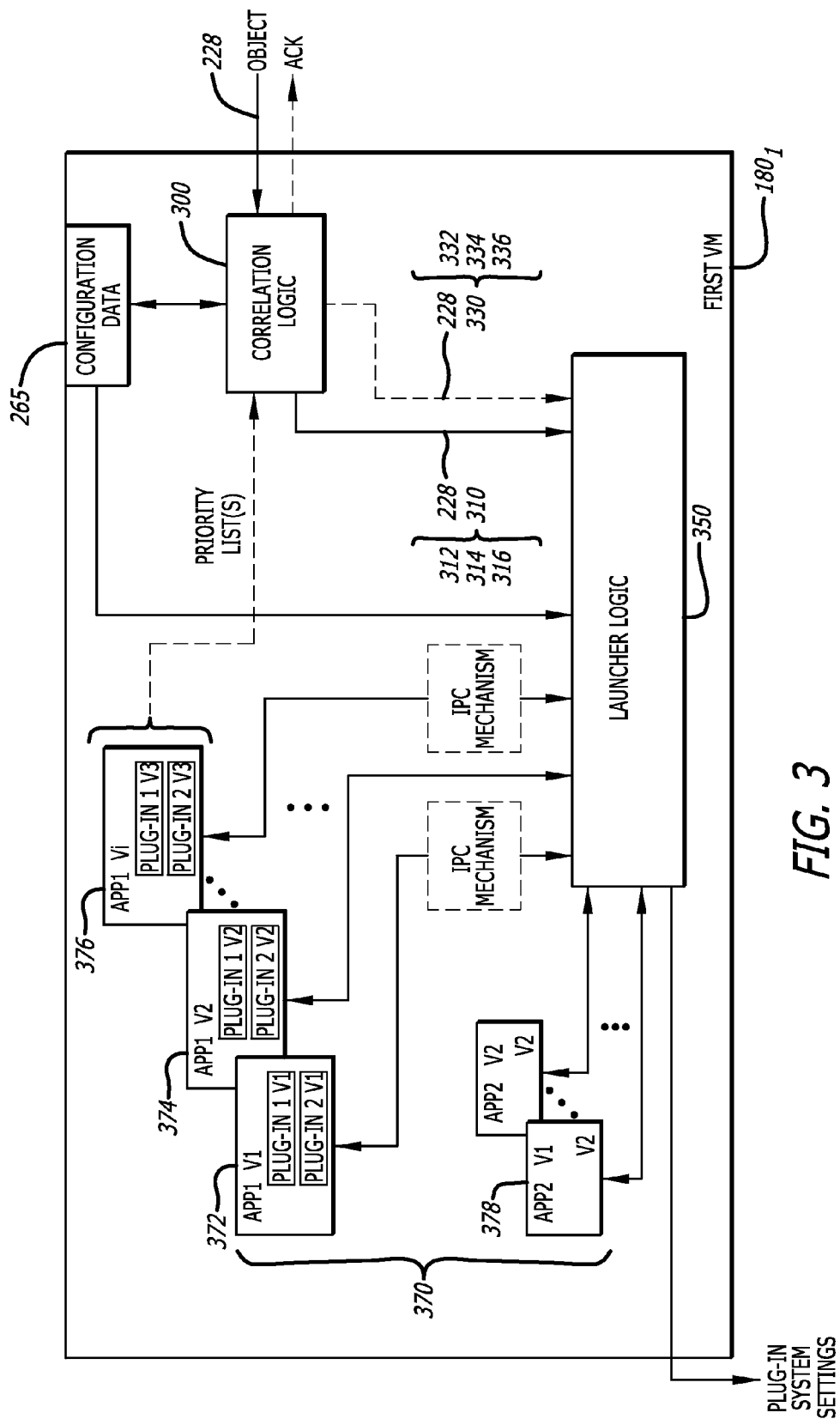
FIG. 3 is a logical representation of a first virtual machine, including logic supporting operability of the first virtual machine.

More specifically, after analysis of the formatted object 226 has been completed, the static analysis engine 170 may provide at least some of the information associated with the formatted object 226 (hereinafter generally referred to as "suspicious object" 228) to the dynamic analysis engine 175 for in-depth dynamic analysis by the VMs $180_1$-$180_N$. For instance, according to one embodiment of the disclosure, a first VM $180_1$ may be adapted to conduct a multi-app, multi-plugin analysis, where the suspicious object 228 is a file path and is analyzed in accordance with a selected multi-app, multi-plugin processing framework. The multi-app, multi-plugin processing framework selects a software profile based, at least in part, on (i) the type of object being analyzed (e.g., certain type of data elements such as a PDF document or Microsoft® Office® document, a URL, etc.) and (ii) configuration data 265 including one or more priority lists that identify a prescribed order of execution on an plug-in basis and/or an application basis as shown in FIG. 3. The configuration data 265 may be provided from an external source such as via a management system 212, a cloud service 214, any third-party source, or even a forensic analysis department analyzing threats on a per customer, multi-customer, industry, region, or country basis. This allows dynamic updating of the configuration data 265 from external sources such as the cloud service, where the updates may be on free or paid subscription basis.

According to one embodiment of the disclosure, the dynamic analysis engine 175 features one or more VMs $180_1$-$180_N$, where each VM $180_1$, . . . , or $180_N$ processes the suspicious object 228 within a run-time environment. For instance, as an optional feature, the dynamic analysis engine 175 may include processing logic 270 that is configured to provide anticipated signaling to the VM $180_1$-$180_N$ during processing of the suspicious object 228, and as such, emulates a source of or destination for communications with the suspicious object 228 while processed within that VM $180_1$, . . . , or $180_N$. As an example, the processing logic 270 may be adapted to operate by providing simulated key inputs from a keyboard, keypad or touch screen or providing certain signaling, as requested by the suspicious object 228 during run-time.

As shown in FIG. 2, the static analysis engine 170 may be adapted to provide SA-based results 280 to the classification engine 250 while the dynamic analysis engine 175 may be adapted to provide the VM-based results 285 to the classification engine 250. According to one embodiment of the disclosure, the SA-based results 280 may include information associated with the characteristics of the formatted object 226 that is potentially indicative of malware (e.g., name, source IP address, object size, etc.). Similarly, the VM-based results 285 may include information associated with the behaviors of the suspicious object 228, which may include abnormal or unexpected system or API calls being invoked or unexpected memory accesses for example.

According to one embodiment of the disclosure, the classification engine 250 is configured to receive the SA-based results 280 and/or the VM-based results 285. Based at least partially on the SA-based results 280 and/or VM-based results 285, the classification engine 250 evaluates the characteristic(s) within the SA-based results 280 and/or the monitored behaviors associated with the VM-based results 285 to determine whether the suspicious object 228 should be classified as "malicious". The engine may receive one or more features as input, either individually or as a pattern of two or more features, and produces a result that may be used to identify whether the suspicious object 228 is associated with a malicious attack. The evaluation may be based on data acquired through experiential knowledge or machine learning.

For instance, the classification engine 250 may conduct a probabilistic modeling process that assigns risk levels to different monitored behaviors of the suspicious object 228 being processed within at least a first VM $180_1$ operating in accordance with multi-app, multi-plugin processing framework. The risk levels may be aggregated to produce a value (e.g., a probability score or risk designation) that denotes whether the suspicious content 228 is malicious (i.e. associated with an exploit attack). Upon determining that the content 228 is associated with a malicious attack, the classification engine 250 may provide information 290 to identify the malicious object, including information that identifies one or more of the monitored activities, to the reporting engine 260.

Furthermore, a detected malicious attack may be classified based on its associated application, plugin combination. Such classification may assist in identifying vulnerabilities currently be exploited for certain application, plug-ins or application/plug-in combinations. The same is true where OS/application or OS/application/plugin combinations are being supported by the multi-app, multi-plugin processing framework.

The reporting engine 260 is configured to receive information 290 from the classification engine 250 and generate alert signals 292, especially in response to the suspicious object 226 being now classified as malicious. The alert signals 292 may include various types of messages, which may include text messages, email messages, video or audio stream, or other types of information over a wired or wireless communication path. The reporting engine 260 features an optional user interface (e.g., touch pad, keyed inputs, etc.) for customization as to the reporting configuration.

Referring now to FIG. 3, a logical representation of a first VM $180_1$ is shown, including logic supporting operability of the first VM $180_1$. The first VM $180_1$ comprises correlation logic 300 and launcher logic 350 that collectively and automatically operate, without human intervention, to produce a multi-app, multi-plugin processing framework 370. The multi-app, multi-plugin processing framework 370 offers a robust analysis of the suspicious content 228 when attempting to detect whether the object 228 includes malware and is associated with a malicious attack. Operating as a process within the first VM $180_1$, the correlation logic 300 is configured to categorize the suspicious content 228 as either a particular data type (e.g., data processing such as Winword®, PDF, etc.) or a URL type. The determined object category is passed as a parameter to the launcher logic 350. Additionally, based on the determined object category, the correlation logic 300 further provides one or more others parameters for use by the launcher logic 350 in selecting a first application/plug-in combination for the multi-app, multi-plugin processing framework 370.

According to one embodiment of the disclosure, the correlation logic 300 is communicatively coupled to the scheduler 235 of FIG. 2. Based on a portion of the incoming data 222, such as a USER AGENT string in a Hypertext Transfer Protocol (HTTP) flow for example, the scheduler 235 may obtain information that identifies a specific type of browser application (e.g., Internet Explorer®, Firefox®, Chrome®, etc.) that sourced the HTTP flow (and thus the suspicious object 228) and optionally its version number (web browser type; version x.y). The information may be provided to correlation logic 300 as part of the configuration data 265.

In response to categorizing the suspicious object 228 as a URL type, the correlation logic 300 provides the suspicious (URL) object 228 and one or more parameters 310 to assist the launcher logic 350 in selecting a particular browser application (e.g., Internet Explorer, FireFox®, Chrome®, etc.) as part of the multi-app, multi-plugin processing framework 370. These parameters 310 may include, but are not limited or restricted to one or more of the following: (1) information that identifies the browser application type and version number when available (hereinafter "object type parameter 312"); (2) information to indicate whether the particular web browser type (and version number when available) has been pre-launched (hereinafter "pre-launch parameter 314"); (3) information to indicate whether plug-in switching functionality in the launcher logic 350 should be disabled in response to the malicious attack being solely based on the application type (hereinafter "plug-in switch parameter 316"); and/or (4) an identification of one or more plug-ins that are currently associated with (supported by) the browser application type identified in the object type parameter 312 (hereinafter "plug-in parameter(s) 318").

In the event that browser application type (or version number) is not available to the scheduler 235, it is contemplated that the correlation logic 300 may be configured to analyze the suspicious object 228, and based on such analysis, categorize the suspicious object 228. For example, the correlation logic 300 may analyze the content of the suspicious object 228 and categorize the suspicious object 228 as a URL type based on for the presence of a "scheme" and/or "path" portion. The "scheme" includes a sequence of alphanumeric characters followed by a colon (:), where examples of schemes include "http", "https", "ftp", or the like. The "path" contains data, usually organized in hierarchical form, which appears as a sequence of alphanumeric characters separated by slashes (/). Thereafter, the correlation logic 300 associates the suspicious object 228 with information representing a default browser application type that may be provided as the object type parameter 312 to the launcher logic 350.

Likewise, the correlation logic 300 may be configured to categorize the suspicious object 228 as a data type based on receipt of the file extension (e.g., .pdf, .doc, .docx, etc.) associated with the suspicious object 228 from the scheduler 235 or an analysis of the content of the suspicious object 228 for a file extension. In response to determining that the suspicious content 228 corresponds to a particular data type, the correlation logic 300 provides the object file path 320 to the suspicious object 228 stored locally and one or more parameters 330 to assist the launcher logic 350 in selecting a particular type of application (e.g., PDF reader, version of Microsoft Office®, etc.) as part of the multi-app, multi-plugin processing framework 370. For instance, one of these parameters 330 may include an object type parameter 332 that identifies a determined category of the object (e.g., Winword®; PDF; etc.). The object type parameter 332 may be referenced by the launcher logic 350 to select appropriate applications from priority list(s) within the configuration data 265 (described below).

Another parameter may include a pre-launch parameter 334, which is information identifying any applications corresponding the object type parameter 332 which have been pre-launched (e.g., Windows® Office® in a certain version, Windows® Office® in another version; Adobe® Acrobat® reader, Foxit® PDF reader, etc.). Applications can be pre-launched to take advantage of memory sharing among multiple VMs. Yet another parameter may include a plug-in switch parameter 336 that is used to enable or disable plug-in switching functionality in the launcher logic 350. The plug-in switching functionality is enabled when it is unclear whether a potential malicious attack may be directed to an application or plug-in while the plug-in switching functionality may be disabled when the malicious attack is solely directed to a particular application or plug-in in order to optimize performance of the first VM $180_1$. Lastly, another parameter includes the plug-in parameter(s) 338, which identifies one or more plug-ins that are currently associated with this data type.

Referring still to FIG. 3, the launcher logic 350 receives information from the correlation logic 300 along with configuration data 265, both of which are used for establishing the multi-app, multi-plugin processing framework 370 for the first VM $180_1$. The multi-app, multi-plugin processing framework 370 is used in the selection of processes running on the first VM $180_1$ for analysis of the suspicious object 228. According to one embodiment of the disclosure, the multi-app, multi-plugin processing framework 370 may be configured by the launcher logic 350 in accordance with a prescribed configuration scheme; however, the application/plug-in combinations selected as part of the multi-app, multi-plugin processing framework 370 are governed by the determined object category (described above) and one or more priority lists 340 (shown in FIGS. 4A-4B) that are part of the configuration data 265.

It is contemplated that the prescribed configuration scheme is designed to provide a more robust VM-based analysis by processing the suspicious object 228 using a variety of different application/plug-in combinations. These application/plug-in combinations are selected to increase the likelihood in detecting (1) whether the object includes malware (analysis using application/plug-in combination(s) that may be more vulnerable to malicious attack or currently targeted by malware), (2) whether a targeted electronic device is susceptible to a malicious attack (analysis using application/plug-in combination(s) that represent the operating environment of the targeted destination for the suspicious object 228), and/or (3) whether the malicious attack corresponds to a zero day attack (analysis using the most fortified application/plug-in combination(s) to determine whether the suspicious object 228 is conducting anomalous behaviors that signify that the object is associated with a previously unknown malicious attack).

As an illustrative example, the configuration scheme may be directed for configuring a first application/plug-in combination 372 for the multi-app, multi-plugin processing framework 370 in accordance with the particular operating environment in which the suspicious object 228 is intended to be processed (e.g., application/plug-in version of an electronic device targeted to receive the object; most common application/plug version for a targeted enterprise; etc.). Thereafter, a second application/plug-in combination 374 for the multi-app, multi-plugin processing framework 370 may be configured based on which application/plug-in combination is currently found to be susceptible to a malicious attack (e.g., the least recent available version of the application (i.e., available within or for download to the malware detection system) along with the least recent plug-in version; any legacy (other than most recent) version of the application along with legacy versions of one or more plug-ins that are currently being attacked more frequently than other combinations based on research provided from machine learning or external resources such as forensic or third-party analysis). A third application/plug-in combination 376 may be configured in accordance with the most fortified application/plug-in combination (e.g., the most recent available version of the application along with the most recent plug-in version) for use in zero-day detection.

Figure 4A:
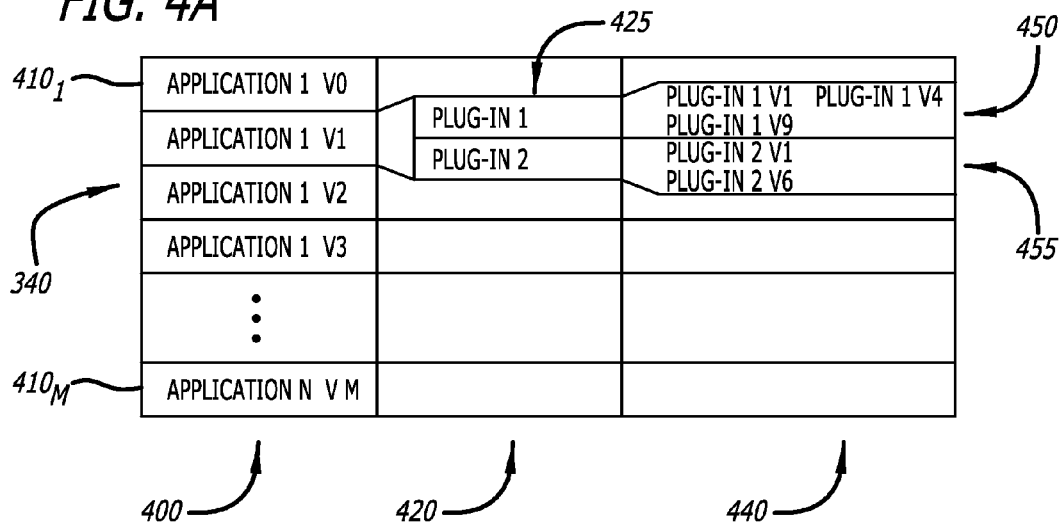
FIG. 4A is a first exemplary embodiment of a priority list that is made available to launcher logic within the first virtual machine of FIG. 3.

As shown in FIG. 4A, a first exemplary embodiment of the priority list 340 that is available to the launcher logic 350 is shown. Herein, the priority list 340 includes an application listing 400 and corresponding plug-in sub-listings 420 and 440 for each application within the application listing 400. More specifically, the application listing 400 includes a prioritized ordering of applications $410_1$-$410_M$ (M≥1) for processing, where each of these applications is accessible to the first VM $180_1$. As shown, these applications $410_1$-$410_M$ may correspond to a specific object type, such as different versions of a specific browser application for example for processing web objects. An application $410_1$ within the prioritized ordering of applications $410_1$-$410_M$ operates as a default application, where the specific placement of the application $410_1$ within the application listing 400 may be used to denote to the launcher logic 350 that this application $410_1$ corresponds to the default application. Alternatively, a numerical value or other order designation indicative of priority to be afforded the associated application may be stored in the application listing 400.

Figure 4B:
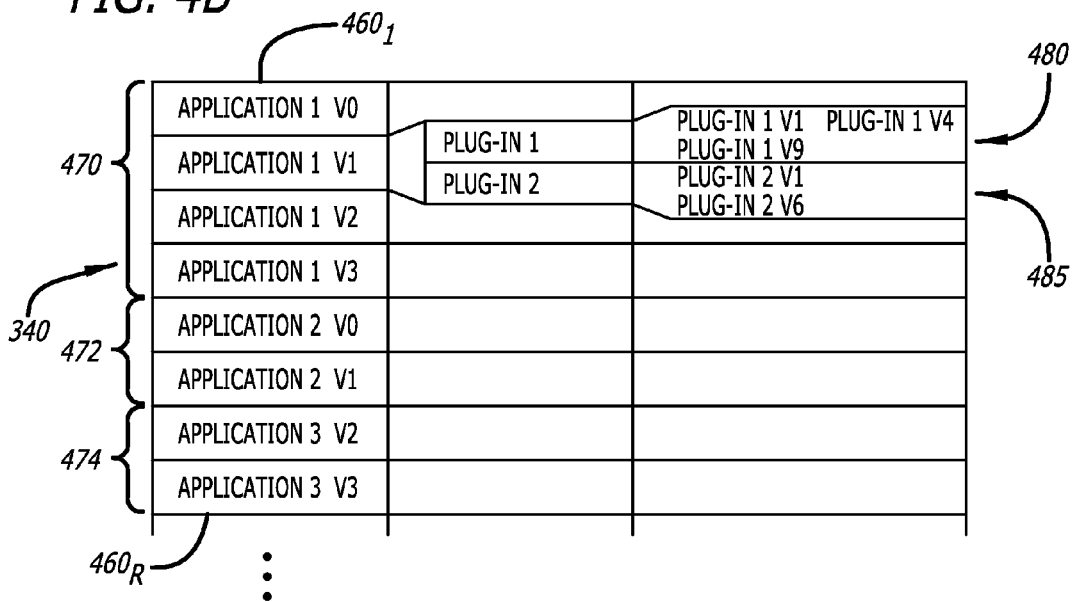
FIG. 4B is a second exemplary embodiment of a priority list that is made available to launcher logic within the first virtual machine of FIG. 3.

Alternatively, as shown in FIG. 4B, the priority list 340 may include a prioritized ordering of all applications accessible to the first VM $180_1$ independent of object type, where applications $410_1$-$410_M$ of FIG. 4A is a subset. However, the prioritized ordering of all applications would be need to be organized so that the launcher logic 350 can discern a sub-list of applications based on a specific browser application type, a specific PDF reader application type or another data type, where each specific object type is assigned a default application. An example of this type of organization is shown below in FIG. 4B. Of course, it is contemplated that other software components, such as OS type and/or version may be a parameter of the priority list 340 for further granularity as to the test configuration.

Herein, the priority scheme for the ordering of the applications $410_1$-$410_M$ may be dependent on one or more factors including, but not limited or restricted to prioritizing applications that are currently determined, on a selected basis (e.g., per customer, per multi-customer, per industry, per region, or per country basis), to be more frequency targeted for malicious attack than other applications of the same category type. Another priority scheme may be based on application release date or the popularity of certain versions of the applications being deployed within devices routinely connected to an enterprise network that is being monitored by the threat detection system 200 of FIG. 2 including first VM $180_1$.

Similarly, as shown in FIG. 4A, the first plug-in of the sub-listing 420 identifies one or more plug-in types 425 (e.g., plug-in_1, plug-in_2, etc.) that are supported by each application listed in the application listing 400. The second plug-in listing 440 identifies different plug-in versions 450 and 455 for each of the plug-in types 425 and the ordering of these plug-in versions 450 and 455 may be in accordance with a preferred priority of deployment when used in connection with that application listed in the application listing 400. For instance, the ordering of plug-in versions 450 and 455 may be based, at least in part, on (i) which plug-ins (and plug-in versions) are currently being targeted more often for malicious attack, (ii) plug-in release date, or (iii) frequency of plug-in usage.

As an alternative embodiment, as shown in FIG. 4B, the priority list 340 features a listing of installed applications $460_1$-$460_R$ (R≥2), which are segmented by specific object type (e.g., first web browser application type 470, word processing applications 472, PDF reader applications 474, etc.). Each segment of applications 470, 472, 474 is ordered in accordance with a selected priority and a default application is identified. As before, the priority may be dependent on one or more factors including, but not limited or restricted to prioritizing applications that are currently determined, on a selected basis (e.g., per customer, per multi-customer, per industry, per region, or per country basis), to be more frequency targeted for malicious attack than other applications of the same category type. As similarly shown in FIG. 4A, the priority list 340 features a sub-list of plug-ins 480 and 485 (e.g., plug-in_1 such as flash, plug-in_2 such as Java® runtime environment "JRE", etc.) supported by each installed application $460_1$-$460_R$ listed in the priority list 340. The plug-ins 480 are ordered in accordance with a selected priority when used with a particular application listed in the priority list 340, such as (i) plug-ins that are currently being targeted more often for malicious attack, (ii) plug-in release date, or (iii) frequency of plug-in usage as described above.

Referring to FIGS. 3, 4A and 4B, in accordance with the illustrative configuration scheme described above, upon receipt of control information from the correlation logic 300 in the form of the object (URL or data element) and/or its corresponding parameters, the launcher logic 350 determines a specific application that mimics the operating environment of a targeted destination, and thereafter, accesses the application listing 400 of the priority list(s) 340 within the configuration data 265 to confirm that the specific application is installed and accessible by the first VM $180_1$. If the specific application is installed and accessible by the first VM $180_1$, based on information within plug-in sub-listings 420 and 440 corresponding to the specific application, the first application/plug-in combination 372 is selected, the corresponding plug-ins are registered with the operating system (OS), and the first application/plug-in combination 372 is launched for instantiating the VM to process the object.

Additionally, the launcher logic 350 may set the second application/plug-in combination 374 for the multi-app, multi-plugin processing framework 370 by accessing content with the application listing 400 to determine whether the application currently found to be susceptible to a malicious attack (which may be positioned at a predetermined location within the application listing 400 or associated with a predetermined priority designation), has not already been used as part of the multi-app, multi-plugin processing framework 370 for processing the object. If not, the application and corresponding plug-ins are selected. However, if the application has already been used in an application/plug-in combination that is part of the multi-app, multi-plugin processing framework 370, the next lower priority version of the application is selected along with the plug-ins having the highest priority that have been identified for that application.

Subsequently or concurrent to these operations, the launcher logic 350 may set the third application/plug-in combination 376 for the multi-app, multi-plugin processing framework 370 by accessing content with the application listing 400 to determine whether the most fortified application (e.g., most recent version of the application and corresponding plug-ins) has been used in the multi-app, multi-plugin processing framework 370. If not, that application and corresponding plug-ins are selected. However, if the application has already been used, the next lower version of the application is selected along with the plug-ins identified for that application as having the highest priority.

Thereafter, the suspicious object 228 is processed by the multi-app, multi-plugin processing framework 370 and behaviors of the each of these application/plug-in combinations is monitored. For the situation where the object is a URL being processed by different versions of a specific browser application and certain anomalous behaviors are being detected, the correlation logic 300 may signal the launcher logic 350 to formulate another multi-app, multi-plugin processing instance for a different browser application type.

As stated above, the processing of the suspicious object 228 may be halted when sufficient indicators are observed, so that VM analysis time can be conserved. Stated differently, the multi-app, multi-plug-in analysis can change course depending on the object behavior and analysis results (e.g., stop analysis after certain suspicious behaviors have been detected, use another application type after certain behaviors have been detected or after a prescribed time has elapsed for this analysis, etc.).

Figure 5:
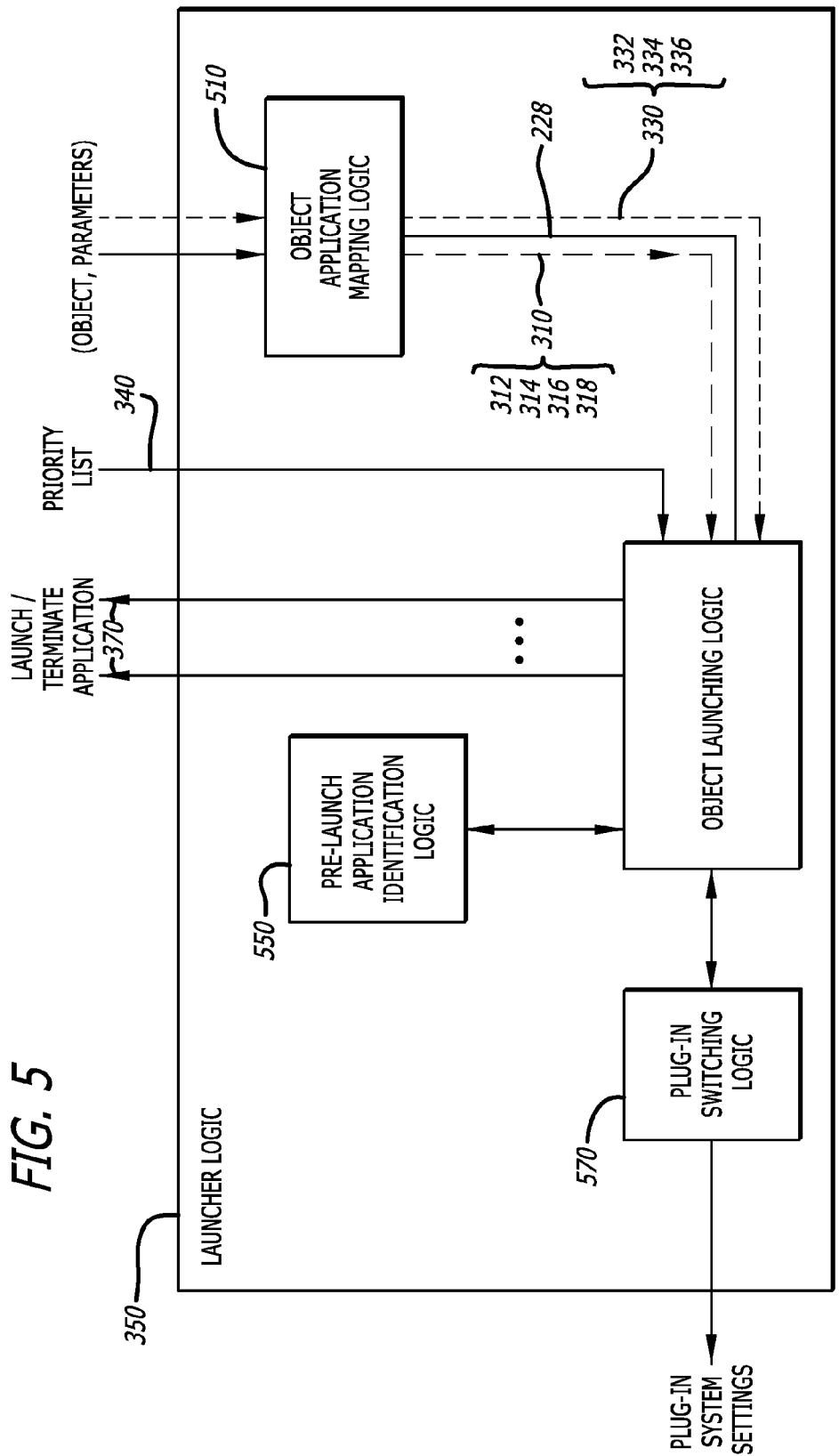
FIG. 5 is a more detailed logical representation of the components within the launcher logic of the first virtual machine of FIG. 3.

Referring to FIG. 5, a more detailed logical representation of the components within the launcher logic 350 of the first VM 180$_1$ of FIG. 3 is shown. As shown in FIGS. 3 and 5, the launcher logic 350 comprises object-application mapping logic 510, object launching logic 530, pre-launched application identifier logic 550 and plug-in switching logic 570. Herein, according to a first embodiment of the disclosure, the suspicious object 228, which is in the form of an object path to a storage location having a particular data element (e.g., file, document, etc.) or a URL, is provided to object-application mapping logic 510 along with one or more parameters 310/330. The parameters 310/330 may include at least one or more of (1) the object type parameter 312/332; (2) a pre-launch parameter 314/334; (3) a plug-in switch parameter 316/336, as described above; and (4) plug-in parameter(s) 318/338. Based on the content of the object type parameter 312/332, the object-application mapping 510 determines the application type for processing the suspicious object 228, and thereafter, provides the object path (pointer to stored data element or URL), an identifier of the application for analyzing the suspicious object 228, and the parameters 310/330 to the object launching logic 530.

The object-launching logic 530 is responsible for configuration of the multi-app, multi-plug-in processing framework 370 by initially determining a first application and version that would likely correspond to an application running within an operating environment targeted by the suspicious object 228. Herein, based on the pre-launched parameter 314/334 provided by the correlation logic 300, the object-launching logic 530 initially determines whether the first application is pre-launched. If so, the object-launching logic 530 queries the pre-launched application identifier logic 550 for a handle corresponding to the pre-launched (first) application. The handle is used by the object launching logic 530 to open the object 228.

In response to the pre-launched application identifier logic 550 being unable to return a handle associated with the first application, which has been identified as being pre-launched by the object-application mapping table 510, an error condition exists. During this error condition, a default application corresponding to the object type is used along with default plug-ins. Plug-in switching logic 570 may be temporarily disabled as no plug-in switching is to occur during the error condition.

In response to the pre-launched application identifier logic 550 returning the handle associated with the first (pre-launched) application and plug-in multiplexing not being disabled that is signaled by content in the plug-in switch parameter provided by the correlation logic 500, the object launching logic 530 checks if the plug-in parameter(s) 318 or 338 is provided. If the plug-in type(s) and version(s) is(are) provided in the priority list 340, the object launching logic 530 may instruct the plug-in switching logic 570 to set the OS setting to use the identified plug-in type(s) and version(s). However if no plug-in parameter(s) 318/338 is provided or no matching plug-in versions are found in priority list 340, the object launching logic 530 selects a plug-in or a series of plug-ins based on the returned application type, such as the highest priority plug-ins for the returned application type.

Prior to launching the first (pre-launched) application by passing a command with the returned handle and the object to the first (pre-launched) application using the IPC mechanism, the object-launching logic 530 may communicate with the guest OS to alter plug-in system settings to register the plug-ins with the OS (e.g., into a Windows® registry for a Windows® OS or into p-lists for an iOS® deployment). Such registration may include altering the services names assigned to these plug-ins and maintaining the altered service names and/or setting appropriate registry values and/or changes to file system entities for the plug-ins.

In response to the pre-launched parameter 314/334 identifying that the first application (hereinafter "Application1_v1") is not pre-launched, the object launching logic 530 accesses the priority list 340 to select an application/plug-in combination for processing the object 228 in accordance with a targeted operating environment. The targeted object environment may be determined based on an external parameter provided with the object 228. After the plug-in(s) are selected, the object launching logic 530 communicates with the guest OS to alter system settings to register altered services names assigned to these plug-ins with the OS (e.g., into the Windows® registry for a Windows® OS or into p-lists for an iOS®). Thereafter, the object launching logic 530 starts the first application/plug-in combination 372 using a launch process (e.g., CreateProcess( ), ShellExecute, etc.) in which the object 228 (URL or path to the file or document) is passed to the first application 372 (Application1_v1) to launch this application/plug-in combination.

Concurrently or subsequent to the launching of the first application/plug-in combination 372, the object launching logic 530 accesses the priority list 340 to select the second application/plug-in combination 374 for processing the object in accordance with a selected configuration scheme. As an example, as shown, the priority list 340 identifies in the application listing that a second version of the first application is currently found to be susceptible to malicious attack. The second version of the first application (hereinafter, "Application1_v2") supports two plug-ins where "plug-in1_v2" and "plug-in2_v2") are assigned the highest priority for suggested use as part of the multi-app, multi-plugin processing framework 370.

Thereafter, the object launching logic 530 accesses the pre-launched application identifier logic 550 for a handle corresponding to the second application. In response to the pre-launched application identifier logic 550 being unable to return a handle associated with the second application where the second application is not pre-launched, the object launching logic 530 may communicate with the OS to alter the system settings to register altered services names assigned to plug-in1_v2 and plug-in2_v2 and initiate a CreateProcess( ) or ShellExecute( ) in which the object (URL or path to the file or document) is passed to the second application (Application1_v2) to launch the application/plug-in combination.

Concurrently or subsequent to the launching of the first or second application/plug-in combination, the object launching logic 550 accesses the priority list 340 to select the third application/plug-in combination 376 for processing the object in accordance with the selected configuration scheme. For instance, as shown, the most fortified (or most recently released) application within the application listing of the priority list 340, namely a third version of the first application, is determined. The third version of the first application (hereinafter, "Application1_v3") supports a single plug-in "plug-in1_v3" as the third version of the application may not support functionality offered by the second plug-in type ("plug-in2").

Thereafter, the object launching logic 530 accesses the pre-launched application identifier logic 550 for a handle corresponding to the third application. In response to the pre-launched application identifier logic 550 being unable to return a handle associated with the third application, as described above, the object launching logic 530 may communicate with the OS to alter plug-in system settings to register altered services names assigned to plug-in1_v3 and initiates a CreateProcess( ) or ShellExecute process in which the object (URL or path to the file or document) is passed to the third application (Application1_v3 376) to launch the application/plug-in combination.

The same operations are conducted for launching the second application group 378 that is part of the multi-app, multi-plugin processing framework 370, including a first version of the second application (Application2_v1) and a second version of the second application (Application2_v2).

It is contemplated that, during monitoring of the behaviors of the application/plug-in combinations 372, 374, 376, 378 during processing of the suspicious object 228, certain types of anomalous behaviors may signal the correlation logic 300 to notify the launcher logic 350 to discontinue launching any additional application/plug-in combinations as the multi-app, multi-plugin analysis may already conclude that the suspicious object 228 is associated with a malicious attack or is clearly benign.

Likewise, it is contemplated that, during monitoring of the behaviors of the application/plug-in combinations 372, 374, 376, 378 during processing of the suspicious object 228, certain types of anomalous behaviors may signal the correlation logic 300 to notify the launcher logic 350 to generate a new multi-app, multi-plugin processing framework using a different application type. For instance, a current multi-app, multi-plugin processing framework may be based on a first type of application, where a secondary analysis conducted by a new multi-app, multi-plugin processing framework based on a second type of application that is different from the first type of application. This secondary analysis is conducted to confirm the finding of malware that is not isolated to a certain application or plug-in type.

IV. General Operational Flow

Figure 6A:
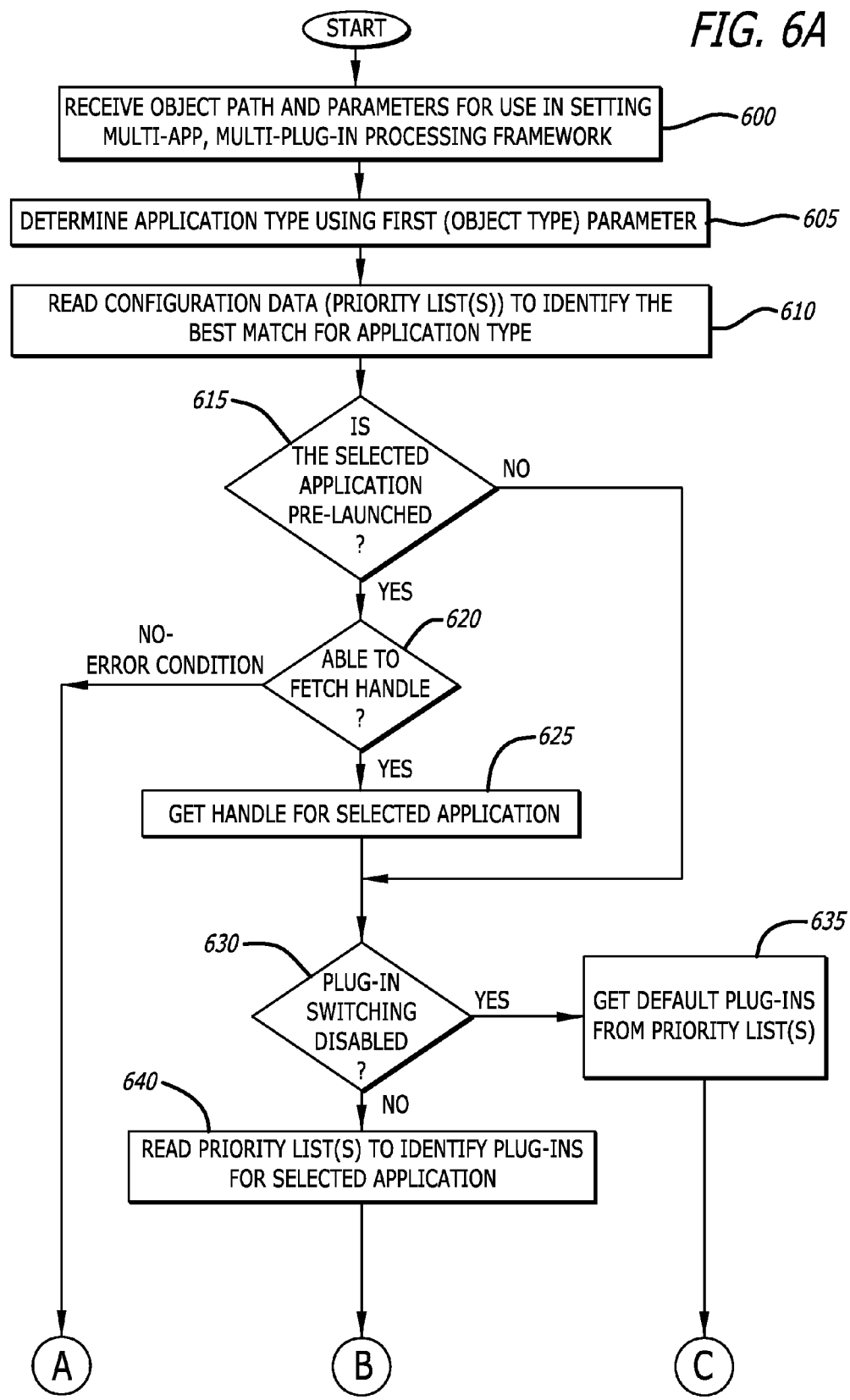
FIGS. 6A-6B are an exemplary embodiment of operations conducted by the launcher logic of FIG. 5 for setting of the multi-app, multi-plugin processing framework for malware analysis of a data element.
Figure 6B:
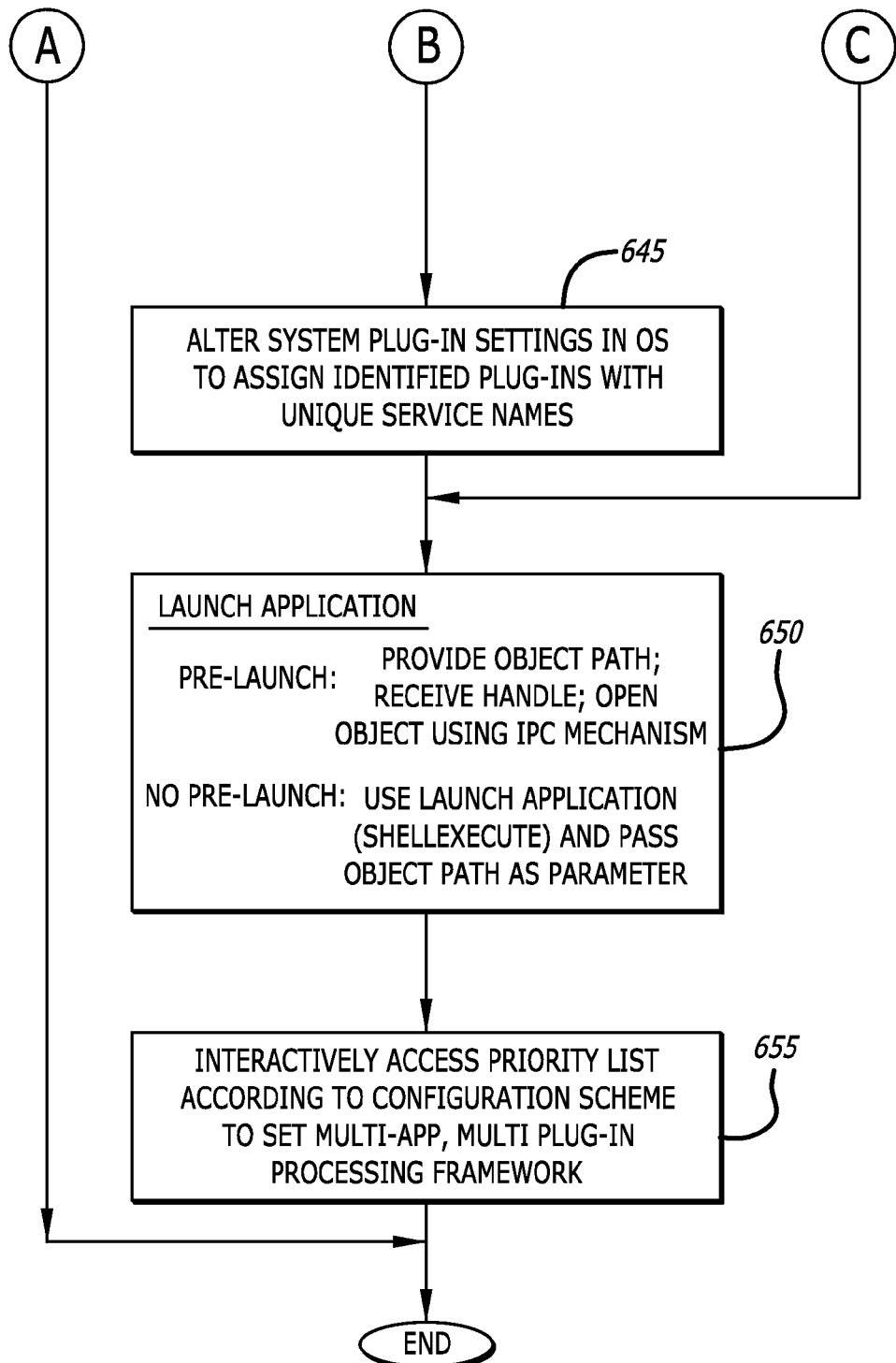

Referring to FIGS. 6A-6B, an exemplary embodiment of operations conducted by the launcher logic for setting of the multi-app, multi-plugin processing framework for malware analysis of a data element is shown. The launcher logic receives an object path and parameters associated with the suspicious object provided to the virtual machine for analysis (block 600). Based on one or more of the supplied parameters, the launcher logic (object-application mapping logic) determines a first application type for the multi-app, multi-plugin processing framework (block 605). Thereafter, configuration data (priority list) is read to identify the best match for the first application type (block 610). For instance, where the exact application (type/version) is listed in the priority list (e.g., application_1_v5), this application is selected for launching as part of the multi-app, multi-plugin processing framework. Where the exact application is not listed in the priority list, the most recent legacy application of the same application type (e.g., lower version such as application_1_v4) may be selected.

Thereafter, a determination is made as to whether the application selected for launching as part of the multi-app, multi-plugin processing is pre-launched (block 615). If so, a handle associated with the pre-launched application is obtained by the launcher logic (blocks 620 and 625). Otherwise, the application selected for launching will need to be launched through a launching application.

Prior to launching the selected application, a determination is made as to whether plug-in switching has been disabled (block 630). If so, the default plug-ins for the particular application type is selected (block 635). Otherwise, the plug-in listings of the priority list that correspond to the selected application are read and plug-in system settings in the OS are set so that these plug-ins are loaded with the launching of the selected application (blocks 640, 645 and 650).

Thereafter, the priority list is accessed to select application/plug-in combinations based on the configuration scheme selected for the multi-app, multi-plugin processing framework (block 655). This process is iterative for additional data elements received for malware analysis.

Figure 7A:
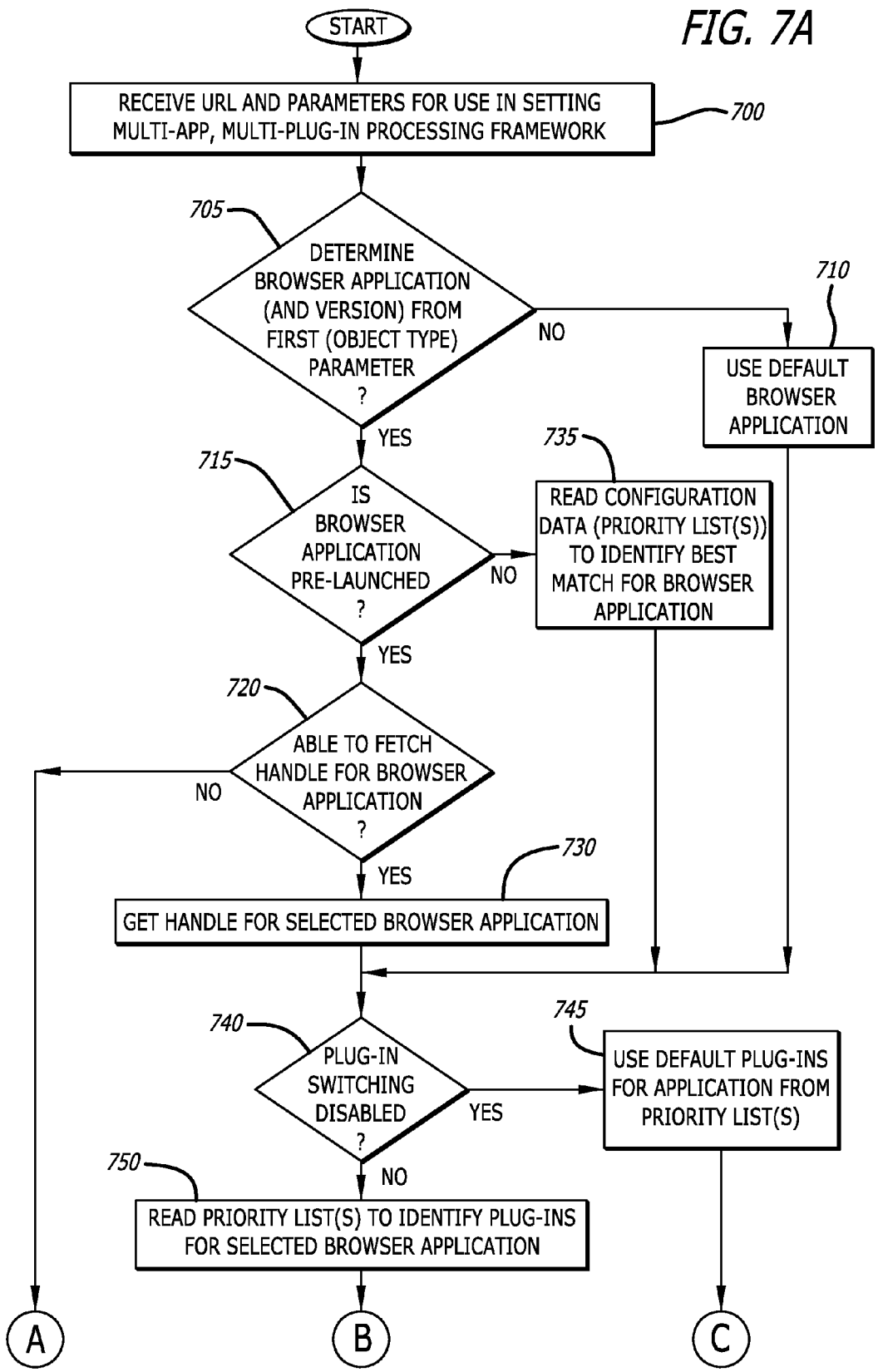
FIGS. 7A-7B are an exemplary embodiment of operations conducted by the launcher logic of FIG. 5 for setting of the multi-app, multi-plugin processing framework for malware analysis of a uniform resource locator (URL).
Figure 7B:
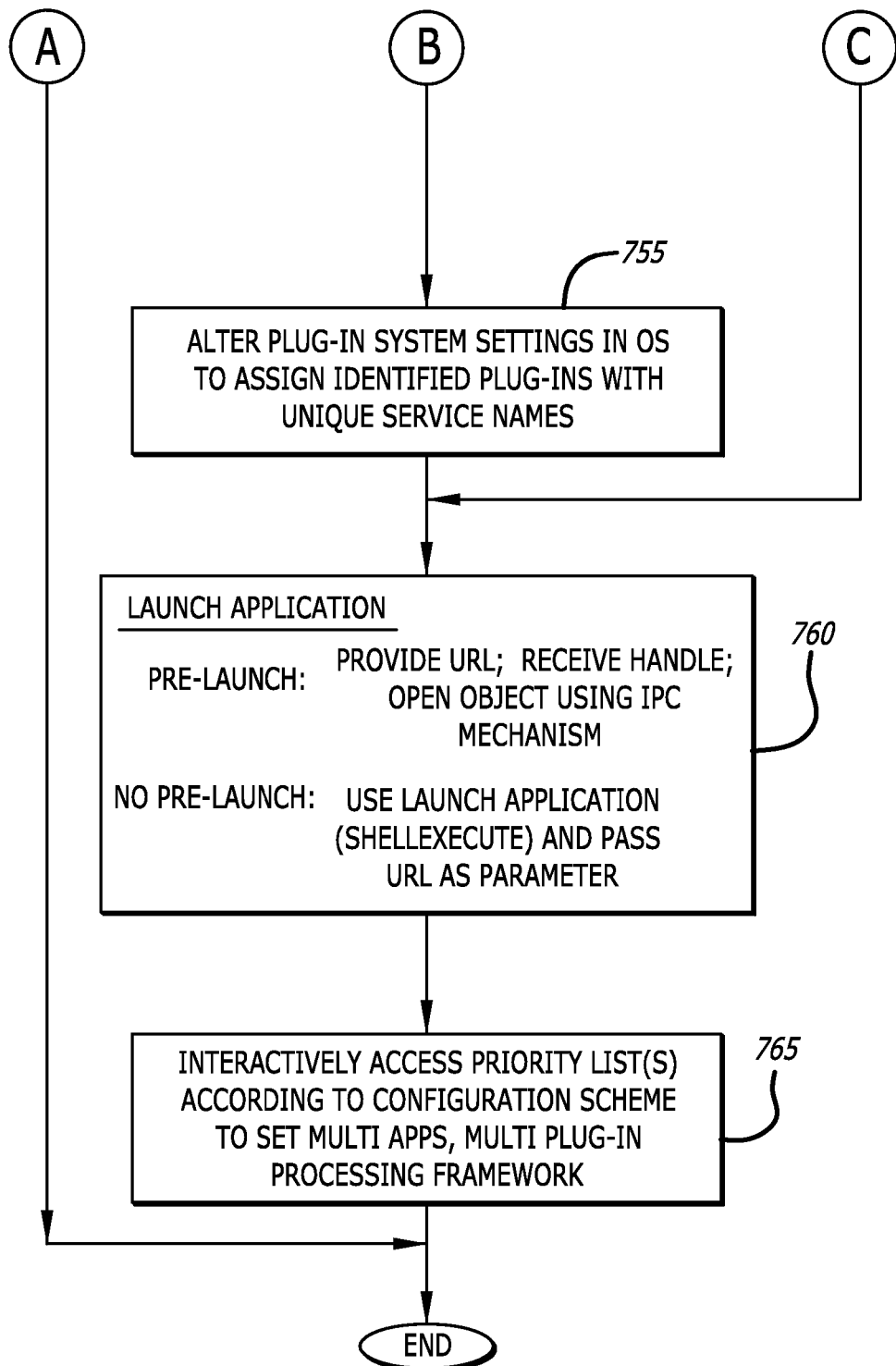

Referring to FIGS. 7A-7B, an exemplary embodiment of operations conducted by the launcher logic for setting of the multi-app, multi-plugin processing framework for malware analysis of a URL is shown. The launcher logic receives a URL for analysis and parameters associated with the suspicious object provided to the virtual machine for analysis (block 700). Based on one or more of the supplied parameters, an analysis is conducted by the launcher logic (object-application mapping logic) as to whether this logic is able to determine a first browser application (and version) of the multi-app, multi-plugin processing framework for processing the URL (block 705). If not, a default browser application is used and the process proceeds to block 740 (block 710).

However, if the browser application (and version) can be determined, a first determination is made as to whether the browser application selected for launching as part of the multi-app, multi-plugin processing is pre-launched (block 715). If so, a second determination is made as to whether the handle for the pre-launched browser application can be retrieved (block 720). If not, an error condition has occurred and the analysis completes (path 725). If the handle can be retrieved, the handle associated with the pre-launched browser application is obtained by the launcher logic (block 730). If the selected browser application is not pre-launched, the configuration data (priority list) is read to identify the best match for the first application type (block 735).

Prior to launching the selected application, a determination is made as to whether plug-in switching has been disabled (block 740). If so, the default plug-ins for the particular application type is selected (block 745). Otherwise, the plug-in listings of the priority list that correspond to the selected browser application are read and plug-in system settings in the OS are set so that these plug-ins are loaded with the launching of the selected application (blocks 750, 755 and 760).

Thereafter, the priority list is accessed to select application/plug-in combinations based on the configuration scheme selected for the multi-app, multi-plugin processing framework (block 765). This process is iterative for additional URLs received for malware analysis.

In the foregoing description, the invention is described with reference to specific exemplary embodiments thereof. It will, however, be evident that various modifications and changes may be made thereto without departing from the broader spirit and scope of the invention as set forth in the appended claims.

What is claimed is:

1. A system for automatically analyzing an object for malware, the system comprising:
    one or more hardware processors; and
    a memory coupled to the one or more hardware processors, the memory comprises a dynamic analysis engine, a classification engine and a reporting engine, wherein
    the dynamic analysis engine, when executed by the one or more hardware processors, generates one or more virtual machines, at least a first virtual machine of the one or more virtual machines includes launcher logic that, upon execution, (i) sets a processing framework for use in configuring a plurality of processes based on a type of object being analyzed and received configuration data identifying a prescribed order of execution of different application and plug-in combinations, (ii) receives information for accessing an object for analysis and parameters associated with the object, and (iii) selects a different application and plug-in combination for each process of the plurality of processes based on the parameters, wherein the plurality of processes concurrently processing the object within the first virtual machine to produce results comprising information associated with behaviors of the object,
    the classification engine classifying the object as part of a potential malicious attack based on the information associated with the behaviors of the object, and
    the reporting engine generating an alert signal indicating the potential malicious attack.

2. The system of claim 1, wherein the launcher is configured to set the processing framework based on the received configuration data including a priority list, the priority list identifying a selected plug-in ordering for analysis of a selected type and version of the application.

3. The system of claim 2, wherein the priority list identifying the selected plug-in ordering based on which plug-in operating with the selected type and version of the application is more frequently targeted for malicious attack.

4. The system of claim 1, wherein the different application and plug-in combinations include a different version of a selected application type and a different version of one or more selected plug-in types.

5. The system of claim 1, wherein the different application and plug-in combinations include a selected application type and one or more different plug-in types.

6. The system of claim 1, wherein the launcher logic reconfigures the processing framework to alter the analysis of the object in accordance with a different application and plug-in combination than previously configured by the launcher logic.

7. The system of claim 1, wherein the first virtual machine further includes correlation logic operating in combination with the launcher logic, the correlation logic to receive information associated with the object and categorize the object as either a Uniform Resource Locator (URL) or a data type, the object being categorized as the data type in response to a determination that the object includes a selected type of file extension.

8. The system of claim 7, wherein the correlation logic provides a file path of the object and an object type parameter that identifies a category of the object to the launcher logic.

9. The system of claim 1, wherein the plurality of processes, being performed within the first virtual machine, include (1) a first process based on a first application and plug-in combination corresponding to an operating environment of an electronic device targeted to receive the object, (2) a second process based on a second application and plug-in combination that is more vulnerable to a malicious attack, and (3) a third process based on a third application and plug-in combination that is a most fortified application and plug-in combination to detect latest and unknown attacks.

10. The system of claim 1, wherein the launcher is configured to set the processing framework based on the received configuration data including a priority list, the priority list identifying a selected plug-in ordering for analysis of a selected type and version of the application, the priority list further comprises an identification of a selected operating system type and version supporting the selected type and version of the application.

11. The system of claim 1, wherein the plurality of processes, being performed within the first virtual machine, include (1) the first process based on the first application and plug-in combination, and (2) a second process based on a second application and plug-in combination different than the first application and plug-in combination.

12. The system of claim 1, wherein the launcher logic to further select, for a second process of the plurality of processes, a second application and plug-in combination different than the first application and plug-in combination.

13. The system of claim 1, wherein the launcher logic to select the different application and plug-in combination for each process of the plurality of processes by at least selecting a first version of a first application instance and a first version of a plugin as the first application and plugin combination for a first process of the plurality of processes and a second version of the first application instance and the first version of the plugin as a second application and plugin combination for a second process of the plurality of processes.

14. The system of claim 1, wherein the launcher logic to select the different application and plug-in combination for each process of the plurality of processes by at least selecting a first version of a first application instance and a first plugin type as the first application and plugin combination for a first process of the plurality of processes and a second version of the first application instance and a second plugin type as a second application and plugin combination for a second process of the plurality of processes.

15. The system of claim 1, wherein the launcher logic to select the different application and plug-in combination for each process of the plurality of processes by at least selecting a first application instance and a first version of a plugin as the first application and plugin combination for a first process of the plurality of processes and a second application instance and a second version of the plugin as a second application and plugin combination for a second process of the plurality of processes.

16. The system of claim 1, wherein the launcher logic to select the different application and plug-in combination for each process of the plurality of processes by at least selecting a first application instance and a first plugin type as the first application and plugin combination for a first process of the plurality of processes and a second application instance and a second plugin type as a second application and plugin combination for a second process of the plurality of processes.

17. A non-transitory storage medium including software that, when executed by one or more hardware processors, perform operations for automatically analyzing an object for malware, the non-transitory storage medium comprising:

a first software component that, when executed by the one or more hardware processors, generates one or more virtual machines;

a launcher logic of at least a first virtual machine of the one or more virtual machines that, upon execution, (i) sets a processing framework for use in configuring a plurality of processes based on a type of object being analyzed and received configuration data identifying a prescribed order of execution of different application and plug-in combinations, (ii) receives information for accessing an object for analysis and parameters associated with the object, and (iii) selects a different application and plug-in combination for each process of the plurality of processes based on the parameters, wherein the plurality of processes concurrently processing the object within the first virtual machine to produce results comprising information associated with behaviors of the object;

a classification engine that, upon execution, classifies the object as part of a potential malicious attack based on the information associated with the behaviors of the object; and the reporting engine that, upon execution, generates an alert signal indicating the potential malicious attack.

18. The non-transitory storage medium of claim 17, wherein the launcher is configured to set the processing framework based on the received configuration data including a priority list, the priority list identifying a selected plug-in ordering for analysis of a selected type and version of the application.

19. The non-transitory storage medium of claim 18, wherein the priority list identifying the selected plug-in ordering based on which plug-in operating with the selected type is more frequently targeted for malicious attack.

20. The non-transitory storage medium of claim 18, wherein the different application and plug-in combinations include a different versions of a selected application type and a different versions of one or more selected plug-in types.

21. The non-transitory storage medium of claim 18, wherein the different application and plug-in combinations include either (i) a different version of a selected application type and a different plug-in types or (ii) a selected application type and a different versions of one or more plug-in types.

22. The non-transitory storage medium of claim 17 further comprising correlation logic operating in combination with the launcher logic, the correlation logic to receive information associated with the object and categorize the object as either a Uniform Resource Locator (URL) or a data type, the object being categorized as the data type in response to a determination that the object includes a selected type of file extension.

23. The non-transitory storage medium of claim 22, wherein the correlation logic provides a file path of the object and an object type parameter that identifies a category of the object to the launcher logic.

24. The non-transitory storage medium of claim 17, wherein the plurality of processes concurrently running within the first virtual machine include (1) a first process based on a first application and plug-in combination corresponding to an operating environment of an electronic device targeted to receive the object, (2) a second process based on a second application and plug-in combination that is more vulnerable to a malicious attack, and (3) a third process based on a third application and plug-in combination that is a most fortified application and plug-in combination to detect zero-day attacks.

25. The non-transitory storage medium of claim 17, wherein the launcher is configured to set the processing framework based on the received configuration data including a priority list, the priority list identifying a selected plug-in ordering for analysis of a selected type and version of the application, the priority list further comprises an identification of a selected operating system type and version supporting the selected type and version of the application.

26. The non-transitory storage medium of claim 17, wherein the plurality of processes, being conducted within the first virtual machine, include (1) the first process based on the first application and plug-in combination, and (2) a second process based on a second application and plug-in combination different than the first application and plug-in combination.

27. The non-transitory storage medium of claim 17, wherein the plurality of processes, being conducted within the first virtual machine, include (1) the first process based on the first application and plug-in combination, and (2) a second process based on a second application and plug-in combination different than the first application and plug-in combination.

28. The non-transitory storage medium of claim 17, wherein the launcher to select the different application and plug-in combination for each process of the plurality of processes by at least selecting a first version of a first application instance and a first version of a plugin as a first application and plugin combination for a first process of the plurality of processes and a second version of the first application instance and the first version of the plugin as a second application and plugin combination for a second process of the plurality of processes.

29. The non-transitory storage medium of claim 17, wherein the launcher to select the different application and plug-in combination for each process of the plurality of processes by at least selecting a first version of a first application instance and a first plugin type as a first application and plugin combination for a first process of the plurality of processes and a second version of the first application instance and a second plugin type as a second application and plugin combination for a second process of the plurality of processes.

30. The non-transitory storage medium of claim 17, wherein the launcher to select the different application and plug-in combination for each process of the plurality of processes by at least selecting a first application instance and a first version of a plugin as a first application and plugin combination for a first process of the plurality of processes and a second application instance and a second version of the plugin as a second application and plugin combination for a second process of the plurality of processes.

31. The non-transitory storage medium of claim 17, wherein the launcher to select the different application and plug-in combination for each process of the plurality of processes by at least selecting a first application instance and a first plugin type as a first application and plugin combination for a first process of the plurality of processes and a second application instance and a second plugin type as a second application and plugin combination for a second process of the plurality of processes.

32. A computerized method for automatically analyzing an object for malware comprising:

running a virtual machine within an electronic device; and analyzing an object being processing within the virtual machine for malware concurrently by a plurality of processes associated with a processing framework by at least (i) setting the-processing framework for use in configuring plurality of processes based on a type of object being analyzed and received configuration data identifying a prescribed order of execution of different application and plug-in combinations, (ii) receiving information for accessing an object for analysis and parameters associated with the object, and (iii) selecting a different application and plug-in combination for each process of the plurality of processes based on the parameters, wherein the plurality of processes concurrently processing the object within the virtual machine to produce results comprising information associated with behaviors of the object;

classifying the object as part of a potential malicious attack based on the information associated with the behaviors of the object; and generating an alert signal indicating the potential malicious attack.

33. The computerized method of claim 32, wherein the setting of the processing framework being-based on the received configuration data including a priority list, the priority list identifying a selected plug-in ordering for analysis of a selected type and version of the application.

34. The computerized method of claim 33, wherein the priority list identifying the selected plug-in ordering based on which plug-in operating with the selected type is more frequently targeted for malicious attack.

35. The computerized method of claim 33, wherein the different application and plug-in combinations include a different versions of a selected application type and a different versions of one or more selected plug-in types.

36. The computerized method of claim 33, wherein the different application and plug-in combinations include either (i) a different version of a selected application type and a different plug-in types or (ii) a selected application type and a different versions of one or more plug-in types.

37. The computerized method of claim 32 further comprising:

receiving information associated with the object; and categorizing the object as either a Uniform Resource Locator (URL) or a data type, the object being categorized as the data type in response to a determination that the object includes a selected type of file extension.

38. The computerized method of claim 37, wherein the categorizing of the object logic being based on a file path of the object and an object type parameter that identifies a category of the object.

39. The computerized method of claim 32, wherein the plurality of processes include (1) a first process based on a first application and plug-in combination corresponding to an operating environment of an electronic device targeted to receive the object, (2) a second process based on a second application and plug-in combination that is more vulnerable to a malicious attack, and (3) a third process based on a third application and plug-in combination that is a most fortified application and plug-in combination to detect zero-day attacks.

40. The computerized method of claim 32, wherein the setting of the processing framework being-based on the received configuration data including a priority list, the priority list identifying a selected plug-in ordering for analysis of a selected type and version of the application, the priority list further comprises an identification of a selected operating system type and version supporting the selected type and version of the application.

41. The computerized method of claim 32, wherein the plurality of processes, being performed within the virtual machine, include (1) the first process based on the first application and plug-in combination, and (2) a second process based on a second application and plug-in combination different than the first application and plug-in combination.

42. The computerized method of claim 32, wherein the selecting of the different application and plug-in combination for each process of the plurality of processes includes selecting a first version of a first application instance and a first version of a plugin as a first application and plugin combination for a first process of the plurality of processes and a second version of the first application instance and the first version of the plugin as a second application and plugin combination for a second process of the plurality of processes.

43. The computerized method of claim 32, wherein the selecting of the different application and plug-in combination for each process of the plurality of processes includes selecting a first version of a first application instance and a first plugin type as a first application and plugin combination for a first process of the plurality of processes and a second version of the first application instance and a second plugin type as a second application and plugin combination for a second process of the plurality of processes.

44. The computerized method of claim 32, wherein the selecting of the different application and plug-in combination for each process of the plurality of processes includes selecting a first application instance and a first version of a plugin as a first application and plugin combination for a first process of the plurality of processes and a second application instance and a second version of the plugin as a second application and plugin combination for a second process of the plurality of processes.

45. The computerized method of claim 32, wherein the selecting of the different application and plug-in combination for each process of the plurality of processes includes selecting a first application instance and a first plugin type as a first application and plugin combination for a first process of the plurality of processes and a second application instance and a second plugin type as a second application and plugin combination for a second process of the plurality of processes.

* * * * *